(12) United States Patent
Yeo et al.

(10) Patent No.: US 9,712,777 B2
(45) Date of Patent: Jul. 18, 2017

(54) DISPLAY SYSTEM, FLEXIBLE REMOTE CONTROLLER, FLEXIBLE DISPLAY APPARATUS, AND CONTROL METHOD THEREOF

(71) Applicant: SAMSUNG ELECTRONICS CO., LTD., Suwon-si (KR)

(72) Inventors: Yong-hoon Yeo, Suwon-si (KR); Tae-hong Kim, Seoul (KR); Ki-hong Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 139 days.

(21) Appl. No.: 14/507,211

(22) Filed: Oct. 6, 2014

(65) Prior Publication Data

US 2015/0187325 A1 Jul. 2, 2015

(30) Foreign Application Priority Data

Jan. 2, 2014 (KR) ........................ 10-2014-0000171

(51) Int. Cl.
*G06F 3/041* (2006.01)
*H04N 5/44* (2011.01)
(Continued)

(52) U.S. Cl.
CPC ........... *H04N 5/4403* (2013.01); *G06F 3/011* (2013.01); *G09F 9/301* (2013.01); *H04N 5/64* (2013.01);
(Continued)

(58) Field of Classification Search
CPC ......... G06F 1/1652; G06F 2203/04102; G06F 2203/04803; G06F 3/017; G06F 3/0487;
(Continued)

(56) References Cited

U.S. PATENT DOCUMENTS

2010/0188422 A1* 7/2010 Shingai .................. G06F 3/016
345/647
2013/0201115 A1* 8/2013 Heubel ................. G06F 3/0487
345/173

(Continued)

FOREIGN PATENT DOCUMENTS

EP 2 202 624 A2 6/2010
EP 2 592 614 A1 5/2013
(Continued)

OTHER PUBLICATIONS

Communication dated May 20, 2015 issued by the European Patent Office in counterpart Application No. 14196831.3.
(Continued)

*Primary Examiner* — Duc Dinh
(74) *Attorney, Agent, or Firm* — Sughrue Mion, PLLC

(57) ABSTRACT

A flexible display apparatus is provided. The flexible display apparatus includes a flexible display, a bending driver configured to deform the flexible display, a receiver configured to receive information indicating deformation of a flexible remote controller, and a controller configured to, in response to the receiver receiving the deformation information, control the bending driver to deform the display to a shape corresponding to the deformation of the flexible remote controller.

17 Claims, 47 Drawing Sheets

(51) Int. Cl.
*G09F 9/30* (2006.01)
*H04N 5/64* (2006.01)
*H04N 21/422* (2011.01)
*G06F 3/01* (2006.01)

(52) U.S. Cl.
CPC . *H04N 21/42206* (2013.01); *H04N 21/42222* (2013.01); *G09G 2380/02* (2013.01); *H04N 2005/4428* (2013.01)

(58) Field of Classification Search
CPC .. G06F 11/1625; G06F 1/1626; G06F 3/0412; G06F 3/0416; G06F 3/016; G06F 3/041; G06F 1/1641; G06F 3/0483; G06F 3/0488; G06F 3/0414; G06F 1/1601; G06F 3/03547; G06F 3/0481; G06F 3/0484; G09G 2380/02; G09G 2320/068; G09G 2340/0464; G09G 2340/14; G09G 2354/00; G09G 3/001; G09G 2320/028; G09G 2320/0693; G09G 2340/0492; G09G 2360/04; G09G 2380/06
USPC ................ 345/1.1–2.3, 156, 173–175, 169
See application file for complete search history.

(56) References Cited

U.S. PATENT DOCUMENTS

2013/0222289 A1* 8/2013 Kwak .................... G06F 3/041
  345/173
2013/0329422 A1* 12/2013 Park ................ G02F 1/133305
  362/233

FOREIGN PATENT DOCUMENTS

EP  2 648 066 A2  10/2013
EP  2 648 078 A2  10/2013

OTHER PUBLICATIONS

Communication dated Mar. 6, 2017 issued by European Patent Office in counterpart European Patent Application No. 14 196 831.3.

* cited by examiner

200

FIG. 42
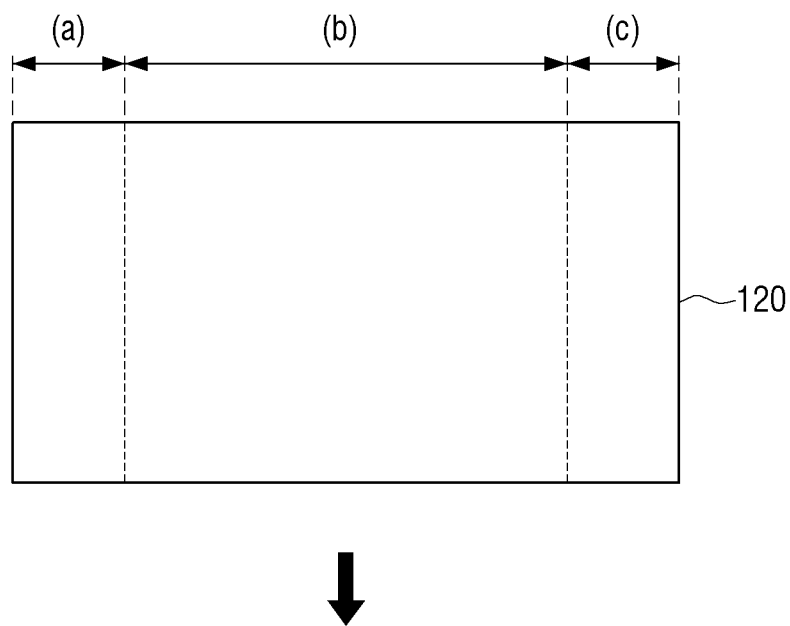
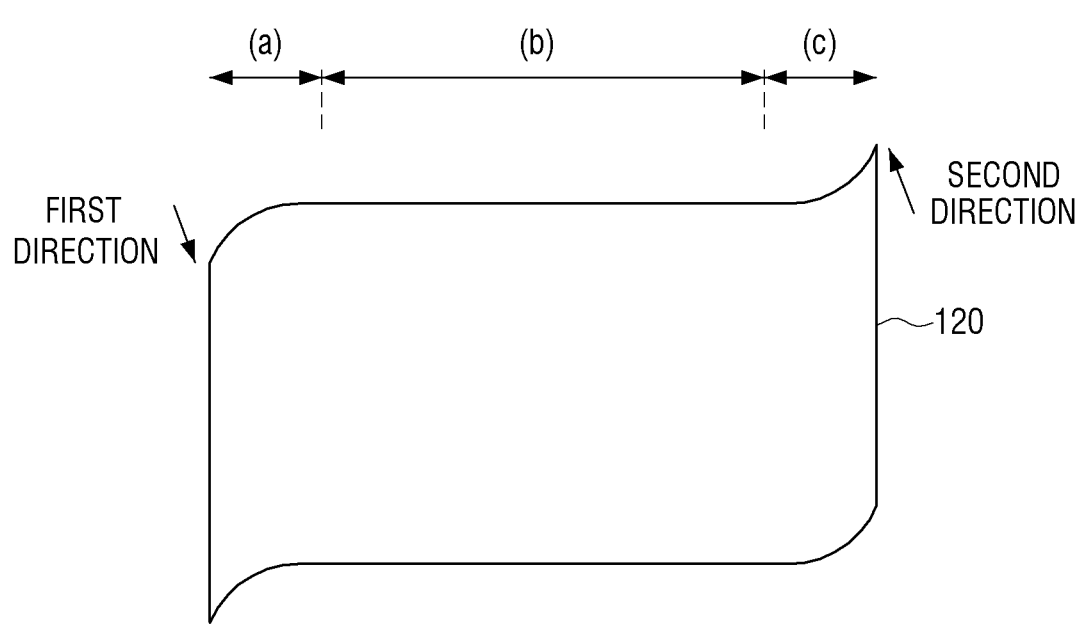

DISPLAY SYSTEM, FLEXIBLE REMOTE CONTROLLER, FLEXIBLE DISPLAY APPARATUS, AND CONTROL METHOD THEREOF

CROSS-REFERENCE TO RELATED APPLICATION

This application claims priority from Korean Patent Application No. 10-2014-0000171, filed on Jan. 2, 2014 in the Korean Intellectual Property Office, the disclosure of which is incorporated herein by reference in its entirety.

BACKGROUND

1. Field

Apparatuses and methods consistent with exemplary embodiments relate to a display system, a flexible remote controller, a flexible display apparatus, and a control method thereof, and more particularly, to a display system which controls a flexible display apparatus according to a bending operation of a flexible remote controller, a flexible remote controller, a flexible display apparatus, and a control method thereof.

2. Description of the Related Art

With the development of electronic technologies, various kinds of electronic apparatuses have been developed. In particular, display apparatuses such as television (TVs), personal computers (PCs), laptops, tablet PCs, mobile phones, and MP3 players are widely used to such an extent that they can be found in most households.

In order to meet consumer demands for new functions and new forms of displays, an effort to develop new forms of display apparatuses is ongoing. One of the results of this effort is a next generation display apparatus in the form of a flexible display apparatus.

The flexible display apparatus refers to a display apparatus that is flexible in its shape and can be deformed or deformed into different shapes and configurations under external control.

Applying an external force, pressing a button of an external apparatus, and touching the display apparatus are the main methods for deforming the shape of the flexible display apparatus. However, these methods present a problem making it difficult to exactly adjust the display apparatus to a desired curvature.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a display system which deforms a shape of a flexible display apparatus according to a bending operation of a flexible remote controller, a flexible remote controller, a flexible display apparatus, and a control method thereof.

According to an aspect of an exemplary embodiment, there is provided a flexible display apparatus including a flexible display, a bending driver configured to deform the flexible display, a receiver configured to receive information indicating deformation of a flexible remote controller, and a controller configured to, in response to the receiver receiving the deformation information, control the bending driver to deform the display to a shape corresponding to the deformation of the flexible remote controller.

The bending driver may include a plurality of piezoelectric elements arranged on a rear surface of the flexible display, and a driving circuit configured to drive each of the plurality of piezoelectric elements according to a driving signal, such that each of the plurality of piezoelectric elements may be deformed in a specific direction according to a polarity of the driving signal.

In response to the flexible remote controller being undeformed within a predetermined threshold time, the controller may undeform the flexible display, and, in response to the flexible remote controller being undeformed after the threshold time elapses, the controller may maintain the deformation of the flexible display.

In response to the flexible remote controller being re-deformed in a predetermined shape while the deformation state of the flexible display is maintained, the controller may undeform the flexible display.

In response to the receiver receiving the information, the controller may be configured to count a deformation time, and, when the counted deformation time exceeds a predetermined threshold time, the controller may deform the flexible display.

In response to the receiver receiving the information, the controller may be configured to control the flexible display to display a user interface (UI) for deforming the flexible display.

According to an aspect of another exemplary embodiment, there is provided a flexible remote controller including a flexible body, a sensor configured to sense deformation of the body, a communicator configured to communicate with a flexible display apparatus; and a controller configured to, in response to the sensor sensing the deformation, control the communicator to transmit deformation information corresponding to the deformation of the body of the flexible display apparatus to instruct the flexible display apparatus to deform to a shape corresponding to the deformation of the body.

The sensor may include a plurality of strain gages arranged on a rear surface or an edge area of the body.

According to an aspect of still another exemplary embodiment, there is provided a display system including a flexible remote controller, and a flexible display apparatus, such that the flexible display apparatus is configured to deform to a shape corresponding to a bending deformation of the remote controller in response to the deformation of the remote controller being bent.

According to an aspect of still another exemplary embodiment, there is provided a method of controlling a flexible display apparatus, the method including receiving information indicating deformation of a flexible remote controller, and, in response to receiving the information, deforming the flexible display apparatus to a shape corresponding to the deformation of the flexible remote controller.

The flexible display apparatus may include a flexible display, and a plurality of piezoelectric elements arranged on a rear surface of the flexible display, and the deforming may include applying a driving signal to each of the plurality of piezoelectric elements based on the information, and deforming each of the plurality of piezoelectric elements in a specific direction according to a polarity of the driving signal.

The method may further include in response to the flexible remote controller being undeformed within a predetermined threshold time, undeforming the flexible display apparatus and, in response to the flexible remote controller being undeformed after the threshold time elapses, maintaining the deformation of the flexible display apparatus.

The method may further include, in response to the flexible remote controller being re-deformed to a predetermined shape while the deformation of the flexible display apparatus is maintained, undeforming the flexible display apparatus.

The bending may include in response to receiving the information, counting a bending time; and, in response to the counted bending time exceeding a predetermined threshold time, deforming the flexible display.

The method may further include displaying a user interface (UI) for deforming the flexible display.

According to an exemplary embodiment, there is provided a method of controlling a flexible display apparatus, the method including sensing deformation of a flexible remote controller, and transmitting to the flexible display apparatus a signal indicating the deformation of the flexible remote controller to instruct the flexible display apparatus to deform to a shape corresponding to the deformation.

The flexible display apparatus may deform to a same shape corresponding to the deformation of the flexible remote controller.

The method may also include deforming the flexible display apparatus to a same shape corresponding to the deformation of the flexible remote controller.

According to an exemplary embodiment, there is provided a display system including a flexible remote controller configured to be deformed and a flexible display apparatus configured to be deformed, such that a deformation of the flexible display apparatus corresponds to a deformation of the flexible remote controller.

The flexible remote controller may include sensors, and the sensors may sense the deformation of the flexible remote controller.

The sensors may be one from among a bend sensor, a strain gage, a gyro sensor, a geomagnetic sensor, and an acceleration sensor.

According to the above-described exemplary embodiments, the shape of the flexible display apparatus can be deformed according to the bending of the flexible remote controller. Accordingly, the user can deform the shape of the flexible display apparatus with a curvature and in a shape as the user desires more easily and exactly, so that user convenience can be improved.

BRIEF DESCRIPTION OF THE DRAWING FIGURES

The above and/or other aspects will be more apparent by describing in detail exemplary embodiments, with reference to the accompanying drawings, in which:

FIGS. 41 and 42 are views illustrating an example of a bending operation of a display of a flexible display apparatus according to an exemplary embodiment;

DETAILED DESCRIPTION OF EXEMPLARY EMBODIMENTS

Figure 1:
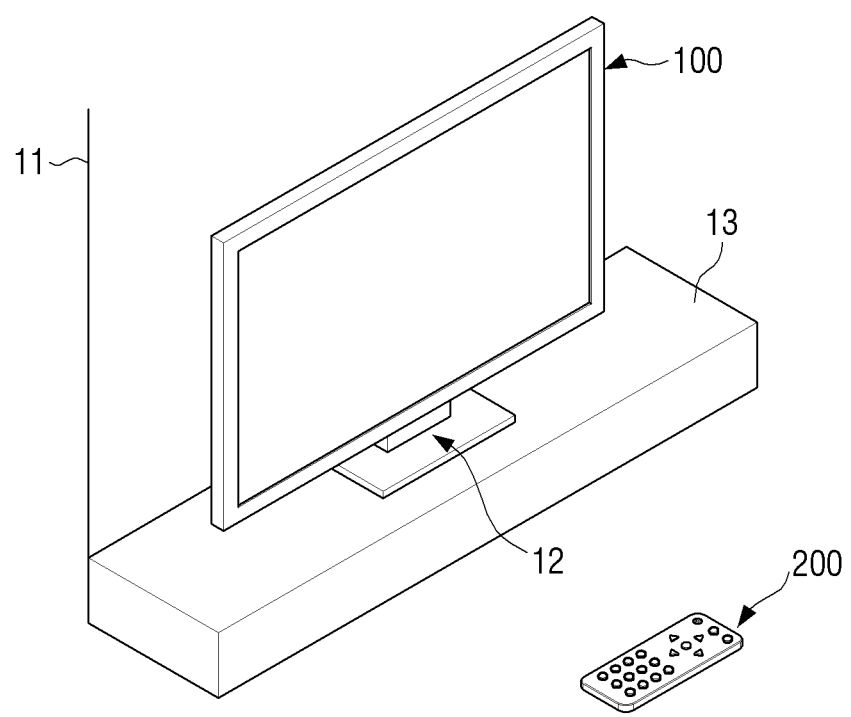
FIG. 1 is a view illustrating a display system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a view illustrating a configuration of a display system 10 according to an exemplary embodiment. Referring to FIG. 1, the display system 10 includes a flexible remote controller 200 and a flexible display apparatus 100.

In FIG. 1, reference numeral 11 indicates a wall surface, reference numeral 12 indicates a support connected to a lower end of the flexible display apparatus 100, and reference numeral 13 indicates a stand where the flexible display apparatus 100 with the support 12 is placed.

The flexible remote controller 200 controls the flexible display apparatus 100 according to a user manipulation. In addition, the flexible remote controller 200 is formed of a flexible material so that it can be deformed or can be restored to its original state by a user's external force, and can control the flexible display apparatus 100 even when its shape is deformed.

Specifically, the flexible remote controller 200 transmits a remote control signal corresponding to a user's manipulation to the flexible display apparatus 100 to control the flexible display apparatus 100. In particular, in response to the flexible remote controller 200 being bent by the user's external force, the flexible remote controller 200 transmits a remote control signal including bending information corresponding to the bending state of the flexible remote controller 200 to the flexible display apparatus 100 to bend the flexible display apparatus 100 in a shape corresponding to the bending state of the flexible remote controller 200.

The bending recited herein refers to deforming the shape of the flexible remote controller 200 or the flexible display apparatus 100 into a bent shape or crooked shape.

The flexible display apparatus 100 is a display apparatus that processes images input from various sources and displays the images, and for example, may be various types of display apparatuses including a monitor, a TV, an electronic album, etc.

In particular, the flexible display apparatus 100 may perform a control operation according to a remote control signal received from the external remote controller 200. In addition, since the flexible display apparatus 100 is manufactured with a flexible material, the flexible display apparatus 100 may be bent under control of a bending driver (not shown), which will be described below.

In response to the remote control signal including the bending information corresponding to the bending stat being received from the flexible remote controller 200, the flexible display apparatus 100 may process the received remote control signal and may be automatically bent in a shape corresponding to the bending state of the flexible remote controller 200 through the bending driver.

Referring to FIG. 1, the flexible remote controller 200 may be placed in a position corresponding to the flexible display apparatus 100. However, this placement is merely an example of an exemplary embodiment for easy understanding and the flexible remote controller 200 is not necessarily bent in the position corresponding to the flexible display apparatus 100.

That is, the flexible remote controller 200 that is bent transmits the bending information through the remote control signal, and the flexible display apparatus 100 receives the remote control signal and is bent according to the bending information of the flexible remote controller 200. Therefore, the user can bend the flexible remote controller 200 into any shape, regardless of the shape in which the flexible remote controller 200 is placed, and can bend the flexible display apparatus 100 in the corresponding shape.

The flexible remote controller 200 and the flexible display apparatus 100 having similar shapes and having sizes proportional to each other may be beneficial to a user's intuitive bending manipulation. For example, if the unbent flexible display apparatus 100 has a rectangular shape of 60 cm by 40 cm and the unbent flexible remote controller 200 has a rectangular shape of 21 cm by 14 cm, the user may bend a specific area of the flexible remote controller 200 and predict a specific area of the flexible display apparatus 100 to be bent according to the bent area of the flexible remote controller 200, so that it is possible to manipulate the bending operation more intuitively.

However, the shape or size proportion of the flexible remote controller 200 is not necessarily the same as that of the flexible display apparatus 100. The flexible display apparatus 100 may be bent by bending the flexible remote controller 200 even when the flexible display apparatus 100 and the flexible remote controller 200 have different shapes or sizes. For example, a specific area of the flexible remote controller 200 may be designed to bend the flexible display apparatus 100, and may be mapped onto a bending area of the flexible display apparatus 100. In this method, the flexible display apparatus 100 may be bent in a corresponding shape by bending the flexible remote controller 200, according to an exemplary embodiment.

The above-described remote control signal may be an Infrared Ray (IR) signal. However, this should not be considered as limiting. The remote control signal may be a signal according to various communication methods such as a Bluetooth signal or a Wi-Fi signal.

Specifically, in the case of an IR remote control signal, locations of remote control signal transmitter and receiver of the flexible remote controller 200 and the flexible display apparatus 100 may be designed by considering straightness of the IR. In the case of a Bluetooth remote control signal or a Wi-Fi remote control signal, the flexible remote controller 200 and the flexible display apparatus 100 may be designed to include a module for each communication.

Figure 2:
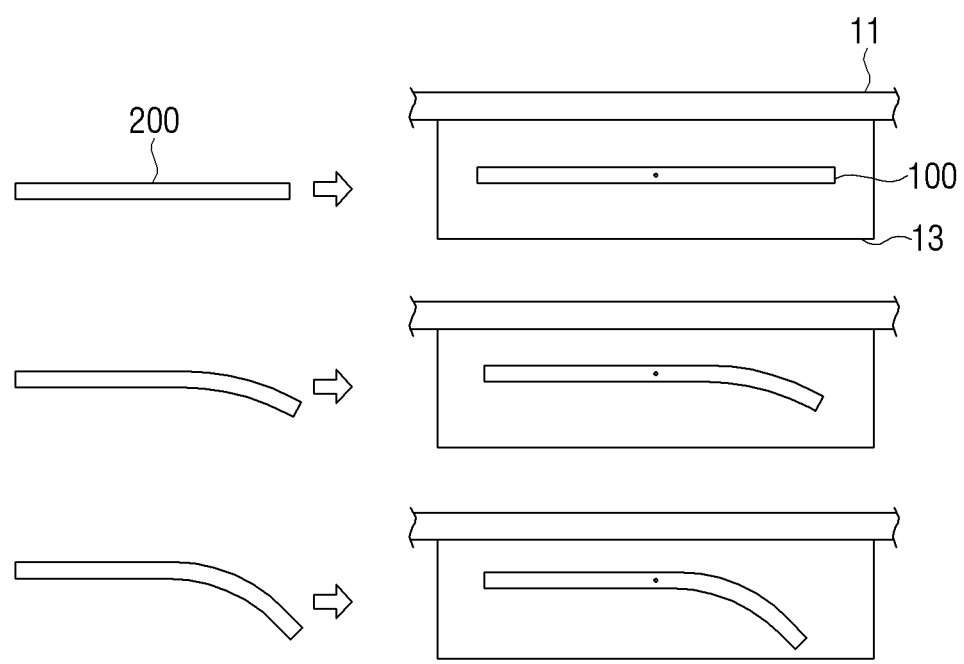
FIGS. 2 and 3 are views illustrating various examples of a bending operation of a flexible display apparatus corresponding to a bending operation of a flexible remote controller in a display system according to an exemplary embodiment.
Figure 3:
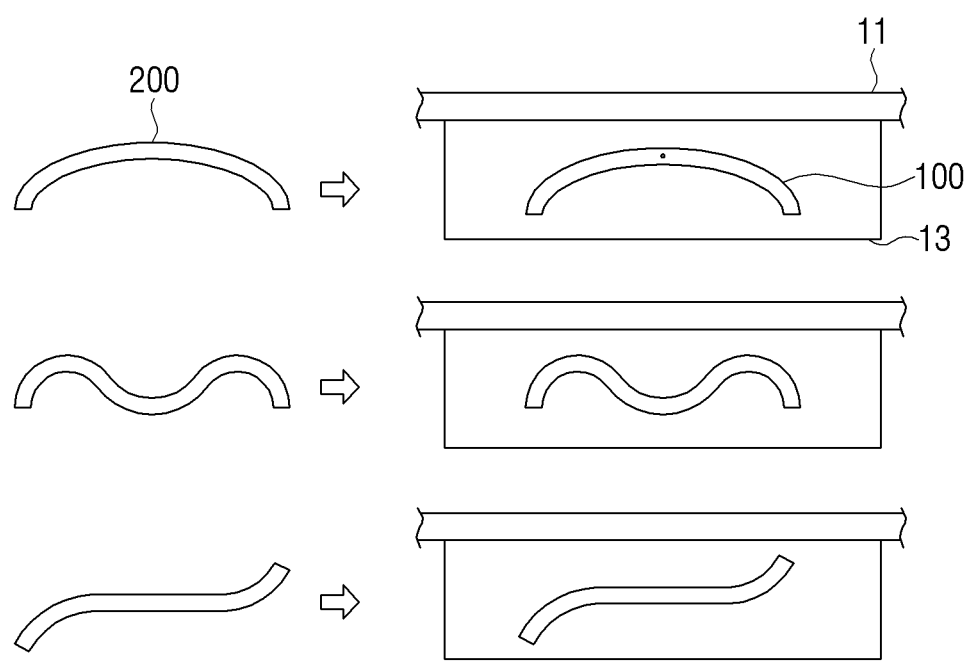

FIGS. 2 and 3 are views illustrating the flexible display apparatus 100 which is bent in a shape corresponding to a bending state of the flexible remote controller 200 in the display system 10.

In FIGS. 2 and 3, the side of the flexible remote controller 200 on which buttons are provided is placed down to correspond to the flexible display apparatus 100. However, as described above with reference to FIG. 1, the placement location or state of the flexible remote controller 200 has nothing to do with the bending operation of the flexible display apparatus 100.

Referring to FIG. 2, the degree of downward bending of the right of the flexible remote controller 200 becomes greater from the top drawing to the bottom drawing, and accordingly, the degree of downward bending of the right of the flexible display apparatus 100 becomes greater toward the bottom drawing.

That is, when the user views the flexible display apparatus 100 on the left of the flexible display apparatus 100, the user has a narrow viewing angle. Therefore, the user can increase the viewing angle by bending the right of the flexible remote controller 200 as shown in FIG. 2.

In addition, the user may bend the flexible remote controller 200 in various shapes as shown in FIG. 3 and may view the flexible display apparatus 100 by bending it in a shape corresponding to the flexible remote controller 200.

That is, since the flexible display apparatus 100 can be bent in a shape corresponding to a bending area, a bending direction, and a degree of bending of the flexible remote controller 200, the user can view the flexible display apparatus 100 in an optimal state by bending the flexible remote controller 200 appropriately according to a viewing angle of the flexible display apparatus 100, a content replayed on the flexible display apparatus 100, and a kind of an executed application.

Although the flexible remote controller 200 and the flexible display apparatus 100 are bent in the horizontal direction in FIGS. 2 and 3, this is merely an example of an exemplary embodiment. The flexible remote controller 200 and the flexible display apparatus 200 may be bent in various shapes such as in a vertical direction or a diagonal direction.

Hereinafter, a configuration of the flexible remote controller 200 and an operation thereof will be explained in detail with reference to FIGS. 4 to 24.

Figure 4:
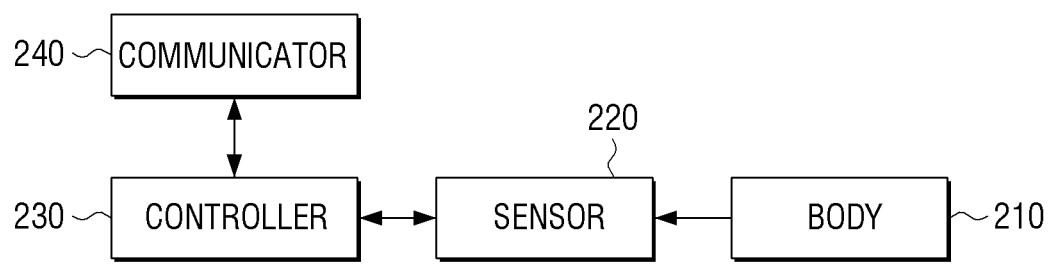
FIG. 4 is a block diagram illustrating a configuration of a flexible remote controller according to an exemplary embodiment.

FIG. 4 is a block diagram illustrating a configuration of the flexible remote controller 200 according to an exemplary embodiment. Referring to FIG. 4, the flexible remote controller 200 includes a body 210, a sensor 220, a controller 230, and a communicator 240.

The body 210 is an element where each of the elements of the flexible remote controller 200, including the sensor 220, the controller 230, and the communicator 240 are mounted, and includes a substrate (not shown) and is made of a flexible material so that it is bendable.

In particular, the flexible remote controller 200 refers to an apparatus that can be bent while maintaining its remote control function. Accordingly, the flexible remote controller 200 should be manufactured on a flexible substrate (not shown).

Accordingly, the body 210 may be implemented by using a plastic material (for example, a polymer film) which is deformable by an external pressure. Specifically, the body 210 has a structure which is formed by barrier coating opposite surfaces of a base film. The base film may be implemented by using various resins such as polyimide (PI), polycarbonate (PC), polyethyleneterephtalate (PET), polyethersulfone (PES), polythylenenaphthalate (PEN), and fiber reinforced plastic (FRP). The barrier coating is performed on the opposite surfaces of the base film. An organic membrane or an inorganic membrane may be used for the purpose of maintaining flexibility. The body 210 may also be formed of other flexible materials, such as metal foil, in addition to the plastic material.

The sensor 220 is configured to detect bending of the flexible remote controller 200. Hereinafter, a configuration of the sensor 220 and a method for detecting bending thereof will be explained with reference to FIGS. 5 to 24.

To achieve the bending detection, the sensor 220 may include a bend sensor which is disposed on a front surface or a rear surface of the body 210, or a bend sensor which is disposed on opposite surfaces of the body 210.

The bend sensor recited herein refers to a sensor that can be bent and has a resistance value which varies according to a degree of bending. The bending sensor may be implemented by using various devices such as an optical fiber bending sensor, a pressure sensor, and a strain gauge.

The sensor 220 may sense a resistance value of the bend sensor by using a level of a voltage applied to the bend sensor or an intensity of a current flowing in the bend sensor, and may sense a bending state in a location of a corresponding bend sensor according to the sensed resistance value.

Figure 5:
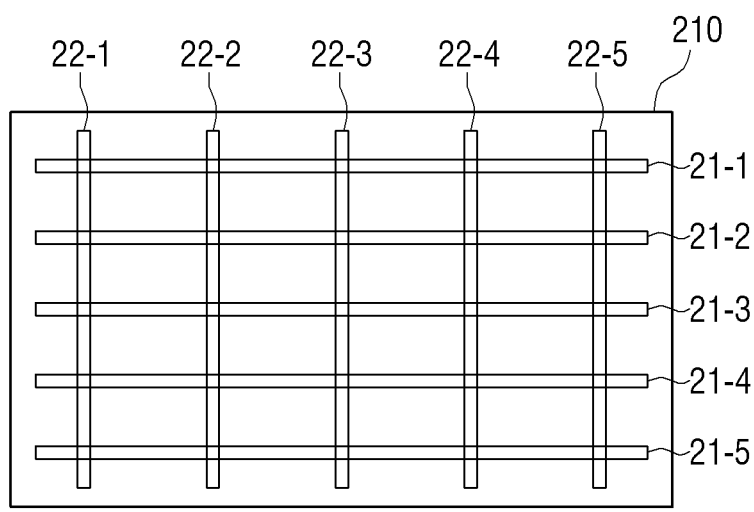
FIGS. 5 to 24 are views illustrating a detailed configuration of a sensor 220 of a flexible remote controller and a method for sensing a bending operation.

FIG. 5 illustrates bend sensors which are embedded in the front surface of the body 210. However, this is merely an example and the bend sensors may be embedded in the rear surface of the body 210 or may be embedded in opposite surfaces. Also, the shape, number, and location of the bend sensors may vary.

FIG. 5 illustrates an example of a plurality of bar-shaped bend sensors which are arranged in a vertical direction and a horizontal direction in a grid pattern according to an exemplary embodiment.

Referring to FIG. 5, the bend sensor includes bend sensors 21-1 to 21-5 which are arranged in a first direction, and bend sensors 22-1 to 22-5 which are arranged in a second direction which is perpendicular to the first direction. The bend sensors are disposed away from one another by a predetermined distance.

In FIG. 5, five bend sensors (21-1 to 21-5, 22-1 or 22-5) are arranged in each of the horizontal direction and the vertical direction in a grid formation. However, this is merely an exemplary embodiment and the number of bend sensors may be changed according to a size of the flexible remote controller 200. The bend sensors are arranged in the horizontal direction and the vertical direction to sense bending from the entire area of the flexible remote controller 200. Therefore, when only a part of the flexible remote controller 200 is flexible or when the flexible remote controller 200 needs to sense bending from only a part of the remote controller 200, the bend sensor may be arranged in only a corresponding portion of the flexible remote controller 200.

Each of the bend sensors 21-1 to 21-5, 22-1 to 22-5 may be implemented by using an electric resistance sensor which uses an electric resistance, or a micro optical fiber sensor which uses a strain of an optical fiber. Hereinafter, the bend sensor will be explained with the assumption that the bend sensor is the electric resistance sensor for the convenience of explanation.

Figure 6:
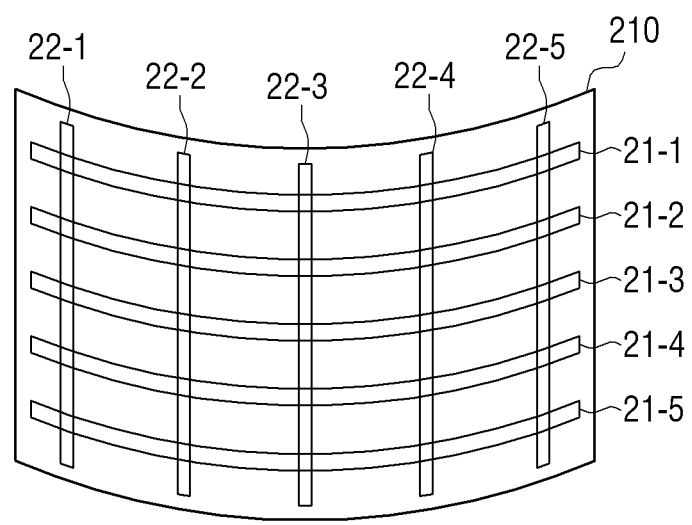

Specifically, as shown in FIG. 6, in response to the flexible remote controller 200 being bent so that its center area with reference to left and right edges of the body 210 is oriented downwardly, a tension caused by bending is exerted to the bend sensors 21-1 to 21-5 which are arranged in the horizontal direction. Therefore, the resistance value of each of the bend sensors 21-1 to 21-5 arranged in the horizontal direction is changed.

Accordingly, the sensor 220 may sense the change in the resistance value output from each of the bend sensors 21-1 to 21-5 and thus determines that bending is performed in the horizontal direction with reference to the center of the body 210. In FIG. 6, the center area is bent in a downward direction (hereinafter, referred to as a Z− direction) which is perpendicular to the surface of the body 210. However, even in response to the center area being bent in an upward direction (hereinafter, referred to as a Z+ direction) with reference to the surface of the body 210, the sensor 220 may sense the horizontal bending based on the change in the resistance value of the bend sensors 21-1 to 21-5 arranged in the horizontal direction.

Figure 7:
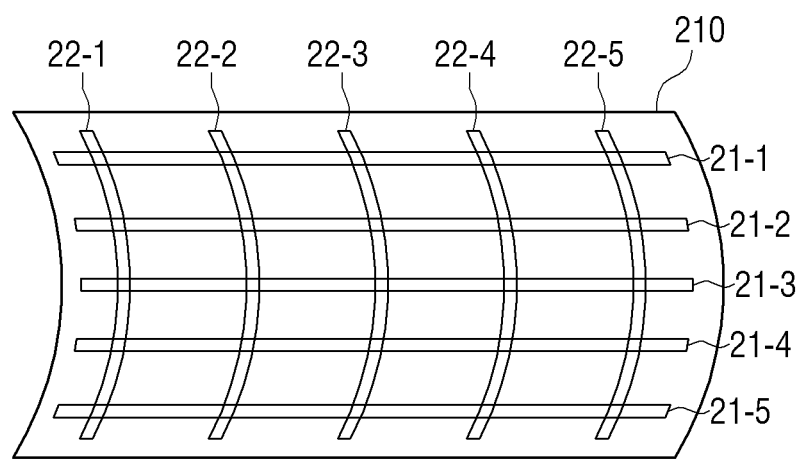

In addition, in response to the flexible remote controller 200 being bent so that the center area with reference to upper and lower edges of the body 210 is oriented upwardly as shown in FIG. 7, a tension is exerted on the bend sensors 22-1 to 22-5 which are arranged in the vertical direction. The sensor 220 may sense shape deformation of the vertical direction based on the resistance values of the bend sensors 22-1 to 22-5 arranged in the vertical direction. Although the bending in the Z+ direction is illustrated in FIG. 7, bending in the Z-direction may also be sensed using the bend sensors 22-1 to 22-5 which are arranged in the vertical direction.

In response to shape deformation occurring in a diagonal direction, a tension is exerted to all of the bend sensors which are arranged in the horizontal direction and the vertical direction. Therefore, the sensor 220 may sense shape deformation of the diagonal direction based on the resistance values of the bend sensors which are arranged in the horizontal and vertical directions.

Hereinafter, a detailed method for the sensor 220 to sense a bending state by using bend sensors will be explained in detail. The bending state recited herein includes a bending area, a degree of bending, and a bending direction of the flexible remote controller 200.

Figure 9:
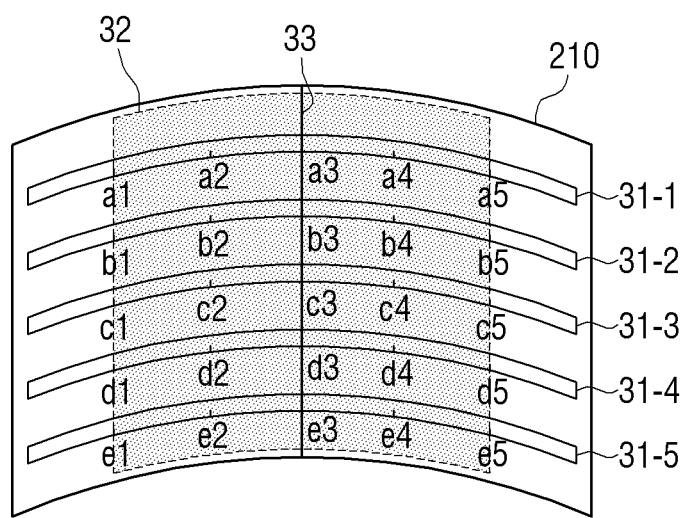
Figure 10:
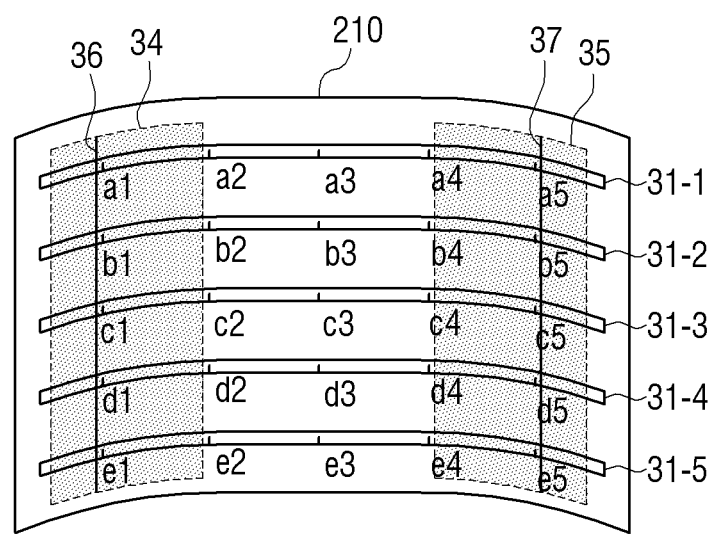

The controller 230 may determine the bending state by using information sensed by the sensor 220. In addition, the sensor 220 may determine the bending state by using the sensed information and may transmit only the determined information to the controller 230. Therefore, hereinafter, the sensor 220 and the controller 230 are interchangeably used as the element for determining the bending state according to convenience of explanation FIGS. 8 to 10 are views illustrating a method for sensing a bending area in the flexible remote controller 200 by using the bend sensors according to an exemplary embodiment.

Figure 8:
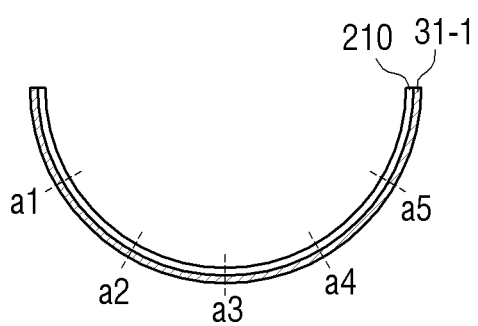

First, FIG. 8 is a cross section view of the body 210 that is bent.

In response to the body 210 being bent, the bend sensors, which are arranged on one surface or opposite surfaces of the body 210, are also bent and have resistance values corresponding to a magnitude of exerted tension.

For instance, in response to the body 210 being bent as shown in FIG. 8, a bend sensor 31-1 which is disposed on a rear surface of the body 210 is also bent and outputs a resistance value varying according to a magnitude of exerted tension.

In this case, the magnitude of the tension increases in proportion to a degree of bending. For example, in response to the bending as shown in FIG. 8, the greatest degree of bending occurs in the center area. Accordingly, the greatest tension is exerted to the bend sensor 31-1, which is disposed at a point a3 which is the center area, and accordingly, the bend sensor 31-1 has the greatest resistance value. On the other hand, the degree of bending gradually decreases toward the outside. Accordingly, the bend sensor 31-1 has smaller resistance values as it goes away from the point a3 to points a2 and a1 or points a4 and a5.

In response to the resistance value output from the bend sensor having the maximum value at a specific point and gradually decreasing in outward directions, the sensor 220 may determine that the area from which the maximum resistance value is sensed is most significantly bent. In addition, regarding an area having no change in the resistance value, the sensor 220 determines that the area is a flat area in which bending is not performed, and, regarding an area having the resistance value changed more than a predetermined value, determines that the area is a slightly bent area.

FIGS. 9 and 10 are views illustrating a method for defining a bending area according to an exemplary embodiment. FIGS. 9 and 10 are views illustrating an exemplary embodiment in which the flexible remote controller 200 is bent in the horizontal direction with reference to the front surface, and thus do not illustrate the bend sensors which are arranged in the vertical direction for the convenience of explanation. Although different reference numerals are used for the bend sensors in each drawing, the bend sensors illustrated in FIG. 5 may be similarly used.

A bending area is an area in which the body 210 is bent. Since the bend sensor also can be bent by bending the flexible remote controller 200, the bending area may be delineated by all points at which the bend sensors output different resistance values from values in the original flat state.

The sensor 220 may sense a size of the bending area, a direction of a bending line, a location of the bending area, and the number of bending areas, based on a relationship between the points at which a change in the resistance value is sensed.

Specifically, when a distance between the points at which the change in the resistance value is sensed lies within a predetermined distance, the points are sensed as one bending area. On the other hand, when the distance between the points at which the change in the resistance value is sensed lies beyond the predetermined distance, different bending areas are delineated with reference to these points. This will be explained in detail below with reference to FIGS. 9 and 10.

FIG. 9 is a view illustrating a method for sensing one bending area, according to an exemplary embodiment. In response to the body 210 of the flexible remote controller 200 being bent as shown in FIG. 9, the resistance values from points a1 to a5 of a bend sensor 31-1, from points b1 to b5 of a bend sensor 31-2, from points c1 to c5 of a bend sensor 31-3, from points d1 to d5 of a bend sensor 31-4, and from points e1 to e5 of a bend sensor 31-5 are different from the resistance values from the aforementioned points in their default or original state.

In this case, the points at which the change in the resistance value is sensed in each bend sensor 31-1 to 31-5 are located within a predetermined distance and are continuously arranged.

Accordingly, the sensor 220 senses an area 32 which includes all of the points, from points a1 to a5 of the bend sensor 31-1, from points b1 to b5 of the bend sensor 31-2, from points c1 to c5 of the bend sensor 31-3, from points d1 to d5 of the bend sensor 31-4, and from points e1 to e5 of the bend sensor 31-5, as one bending area.

FIG. 10 is a view illustrating a method for sensing a plurality of bending areas.

In FIG. 10, according to bending of the body 210, the resistance values from points a1 to a2 and from points a4 to a5 of the bend sensors 31-1, from points b1 to b2 and from points b4 to b5 of the bend sensor 31-2, from the points c1 to c2 and from points c4 to c5 of the bend sensor 31-3, from the points d1 to d2 and from the points d4 to d5 of the bend sensors 31-4, and from the points e1 to e2 and from the points e4 to e5 of the bend sensor 31-5 are different from the resistance values of points in their default or original state.

The points from a1 to a2 and the points from a4 to a5 in the bend sensor 31-1 are continuous with reference to each point. However, since a point a3 exists between the points a2 and a4, the points from a2 to a4 are not continuous. Accordingly, when the points a2 and a4 are regarded as being disposed away from each other by a predetermined distance, the bending area is divided into a different bending area from the points a1 to a2 and a bending area from the points a4 to a5. Also, the points in the other bend sensors 31-2 to 31-5 may be divided in this way.

Accordingly, the flexible remote controller 200 delineates an area 34 including all of the points from a1 to a2 of the bend sensor 31-1, from b1 to b2 of the bend sensor 31-2, from c1 to c2 of the bend sensor 31-3, from d1 to d2 of the bend sensor 31-4, and from e1 to e2 of the bend sensor 31-5, as one bending area, and delineates an area 35 including all of the points from a4 to a5 of the bend sensor 31-1, from b4 to b5 of the bend sensor 31-2, from c4 to c5 of the bend sensor 31-3, from d4 to d5 of the bend sensor 31-4, and from e4 to e5 of the bend sensor 31-5, as another bending area.

The bending area may include a bending line. The bending line refers to a line which connects the points at which the greatest resistance value is sensed in each bending area.

For instance, in the case of FIG. 9, a line 33 in the bending area 32, which connects the point a3 at which the greatest resistance value is output in the bend sensor 31-1, the point b3 at which the greatest resistance value is output in the bend sensor 31-2, the point c3 at which the greatest resistance value is output in the bend sensor 31-3, the point d3 at which the greatest resistance value is output in the bend sensor 31-4, and the point e3 at which the greatest resistance value is output in the bend sensor 31-5, corresponds to a bending line. FIG. 9 illustrates the bending line which is formed in the center area of the body 210 in the vertical direction.

In the case of FIG. 10, a line 36 in the bending area 34, which connects the point a1 at which the greatest resistance value is output in the bend sensor 31-1, the point b1 at which the greatest resistance value is output in the bend sensor 31-2, the point c1 at which the greatest resistance value is output in the bend sensor 31-3, the point d1 at which the greatest resistance value is output in the bend sensor 31-4, and the point e1 at which the greatest resistance value is output in the bend sensor 31-5, delineates one bending line. A line 37 in the bending area 35, which connects the point a5 at which the greatest resistance value is output in the bend sensor 31-1, the point b5 at which the greatest resistance value is output in the bend sensor 31-2, the point c5 at which the greatest resistance value is output in the bend sensor 31-3, the point d5 at which the greatest resistance value is output in the bend sensor 31-4, and the point e5 at which the greatest resistance value is output in the bend sensor 31-5, delineates another bending line. That is, in FIG. 10, the two vertical bending lines are formed near the left and right edges of the body 210.

As described above, the flexible remote controller 200 may be bent in various shapes and the controller 230 may sense each bending state based on a result of the sensing by the sensor 220. In addition, the controller 230 may determine how the flexible remote controller 200 is bent, that is, a degree of bending, based on a result of the sensing by the sensor 220.

Figure 11:
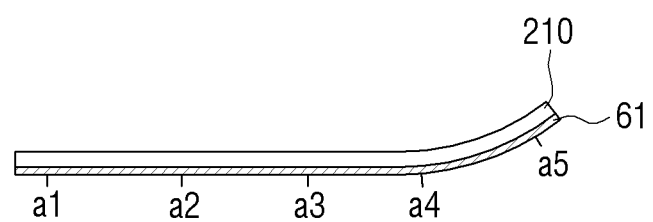
Figure 12:
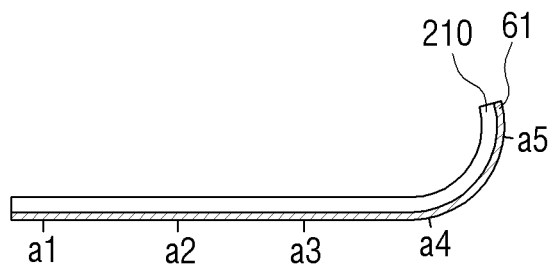

FIGS. 11 and 12 are views illustrating a method for determining a degree of bending, according to an exemplary embodiment.

Referring to FIGS. 11 and 12, the flexible remote controller 200 determines a degree of bending of the flexible remote controller 200 by using a change in the resistance value output from the bend sensor at predetermined intervals.

Specifically, the controller 230 calculates a difference between a resistance value of a point where the greatest resistance value of a bend sensor is output and a resistance value output at a point which is disposed away from the point of the greatest resistance value by a predetermined distance.

The controller 230 determines a degree of bending by using the calculated difference in the resistance value. Specifically, the flexible remote controller 200 divides the degree of bending into a plurality of levels, matches each level with a resistance value of a predetermined range, and stores the matched values.

Accordingly, the controller 230 determines the degree of bending of the flexible display apparatus according to which level of the plurality of levels corresponds to the calculated resistance value difference.

For instance, as shown in FIGS. 11 and 12, the degree of bending is determined based on a difference between a resistance value output at a point a5 where a bend sensor 61 disposed on the rear surface of the body 210 outputs the greatest resistance value, and a resistance value output at a point a4 which is disposed away from the point a5 by a predetermined distance.

Specifically, a level corresponding to the resistance value difference, which is calculated in the exemplary embodiment of FIGS. 11 and 12, is identified from among the plurality of pre-stored levels, and a degree of bending is determined based on the identified level. The degree of bending may be represented by a bending angle or an intensity of bending.

Since the degree of bending illustrated in FIG. 12 is greater than that of FIG. 11, the difference between the resistance value output at the point a5 and the resistance value output at the point a4 in the exemplary embodiment of FIG. 12 is greater than the difference between the resistance value output at the point a5 and the resistance value output at the point a4 in the exemplary embodiment of FIG. 11. Accordingly, in response to the flexible remote controller 200 being bent as shown in FIG. 12, the controller 230 may determine that the degree of bending is increased.

As described above, the flexible remote controller 200 may be bent in different directions, a Z+ direction or a Z− direction.

The bending direction may be sensed in various ways. For instance, two bend sensors may be disposed one on the other and the bending direction is determined based on a difference of change in the resistance value of each bend sensor. A method for sensing a bending direction by using overlapping bend sensors will be explained with reference to FIGS. 13 to 15.

Figure 13:
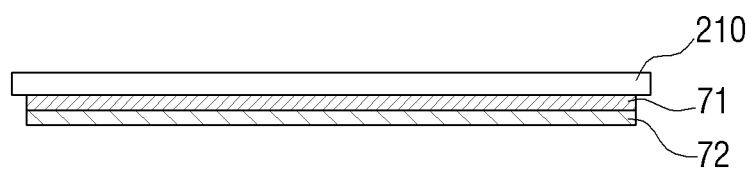

Referring to FIG. 13, two bend sensors 71 and 72 may be disposed to overlap each other on one side of the body 210. In this case, in response to bending being performed in one direction, different resistance values are output from the upper bend sensor 71 and the lower bend sensor 72 at a point where the bending is performed. Accordingly, the bending direction may be determined by comparing the resistance values of the two bend sensors 71 and 72 at the same point.

Figure 14:
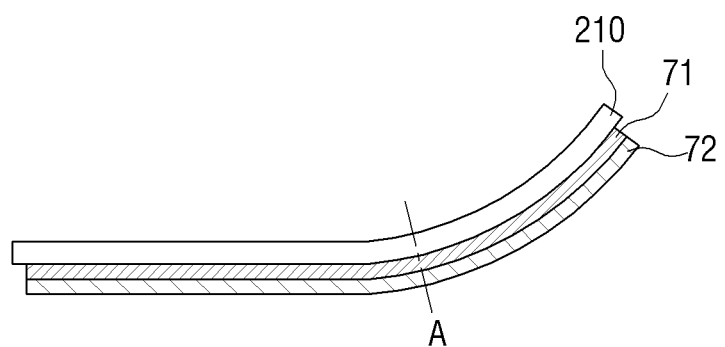

Specifically, in response to the body 210 being bent in the Z+ direction as shown in FIG. 14, a greater tension than that of the upper bend sensor 71 is exerted to the lower bend sensor 72 at a point 'A' corresponding to a bending line.

Figure 15:
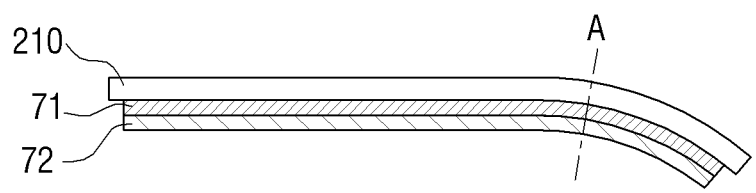

On the other hand, in response to the body 210 being bent toward the rear surface as shown in FIG. 15, a greater tension than that of the lower bend sensor 72 is exerted to the upper bend sensor 71.

Accordingly, the controller 230 senses the bending direction by comparing the resistance values of the two bend sensors 71 and 72 at the point A.

Although the two bend sensors are disposed to overlap each other on one side of the body 210 in FIGS. 13 to 15, the bend sensors may be disposed on opposite surfaces of the body 210.

Figure 16:
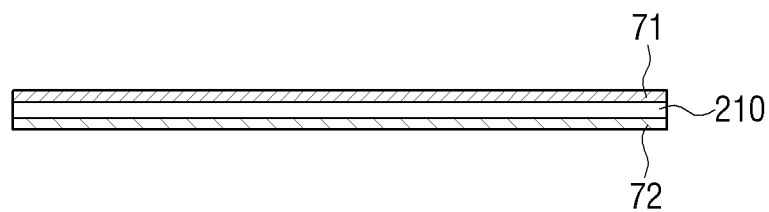

FIG. 16 illustrates the two bend sensors 71 and 72 which are disposed on the opposite surfaces of the body 210.

Accordingly, in response to the body 210 of the flexible remote controller 200 being bent in a first direction perpendicular to the surface, that is, the Z+ direction, the bend sensor that is disposed on a first surface of the opposite surfaces of the body 210 is subject to a compressive force, whereas the bend sensor that is disposed on a second surface is subject to a tension. On the other hand, in response to the flexible remote controller 200 being bent in a second direction opposite to the first direction, that is, the Z− direction, the bend sensor disposed on the second surface is subject to a compressive force, whereas the bend sensor disposed on the first surface is subject to a tension. As described above, the different values are detected from the two bend sensors according to the bending direction and the controller 230 determines the bending direction according to a detection characteristic of the value.

Although the bending direction is sensed by using the two bend sensors in FIGS. 13 to 16, the bending direction may be sensed by means of only a strain gage disposed on one surface of the body 210. That is, a compressive force or tension is exerted on the strain gage disposed on one surface according to a bending direction, and thus the bending direction can be determined by identifying a characteristic of the output value.

Figure 17:
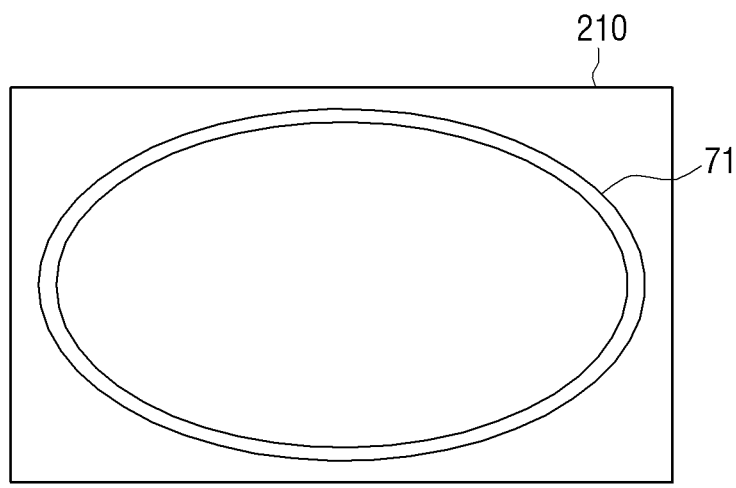

FIG. 17 is a view illustrating an exemplary embodiment of a single bend sensor which is disposed on one surface of the body 210 to sense bending. Referring to FIG. 17, a bend sensor 71 may be implemented in a form of a looped curve forming a circle, a quadrangle, or other polygons, and may be disposed along an edge of the body 210. The controller 230 may determine a point on the looped curve at which a change in an output value is sensed to be a bending area. The bend sensor may be connected to the body 210 in a form of an open curve such as an S shape, a Z shape, or a zigzag shape.

Figure 18:
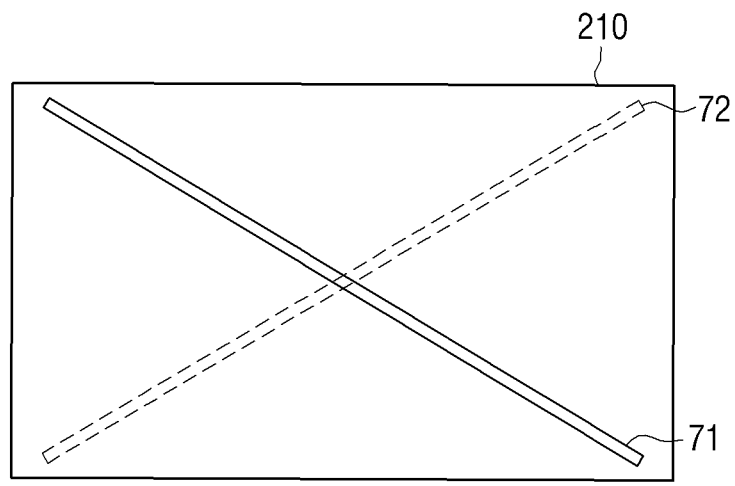

FIG. 18 is a view illustrating two bend sensors which intersect. Referring to FIG. 18, a first bend sensor 71 is disposed on a first surface of the body 210 and a second bend sensor 72 is disposed on a second surface of the body 210. The first bend sensor 71 is disposed on the first surface of the body 210 in a first diagonal direction, and the second bend sensor 72 is disposed on the second surface in a second diagonal direction. Accordingly, resistance output values and output points of the first and second bend sensors 71 and 72 vary according to various bending conditions such as a case in which each corner of the body 210 is bent, a case in which each edge is bent, a case in which a center is bent, and a case in which folding or rolling is performed. Accordingly, the controller 230 may determine which type of bending is performed according to a characteristic of the output value.

Although line type bend sensors are used in the above-described various exemplary embodiments, bending may be sensed by using a plurality of separate strain gages.

FIGS. 19 to 22 are views illustrating an exemplary embodiment of the sensor 220 sensing a bending of the flexible remote controller 200 by using a plurality of strain gages. The strain gage uses metal or a semiconductor in which a resistance is greatly changed according to an applied force, and senses deformation of a surface of an object to be measured according to a change in the resistance value. It is common that a material such as metal increases a resistance value when its length is stretched by an external force, and decreases the resistance value when the length is contracted. Accordingly, it is determined whether bending is performed or not by sensing a change in the resistance value.

Figure 19:
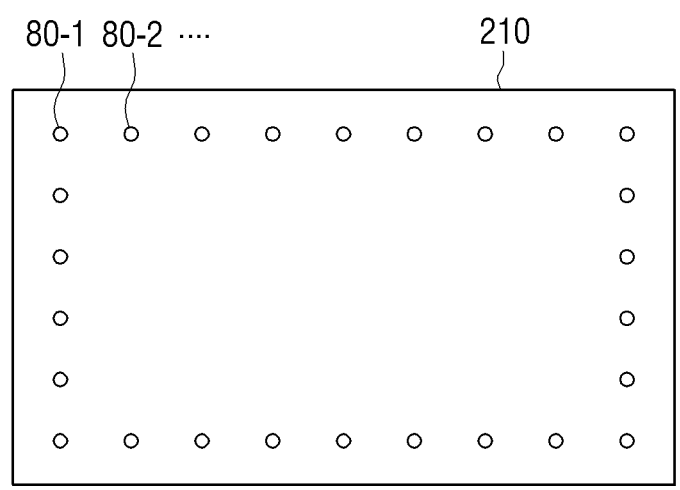

Referring to FIG. 19, a plurality of strain gages are arranged along an edge of the body 210. The number of strain gages may vary according to a size and a shape of the flexible remote controller 200, or a predetermined bending sensing resolution, etc.

Figure 20:
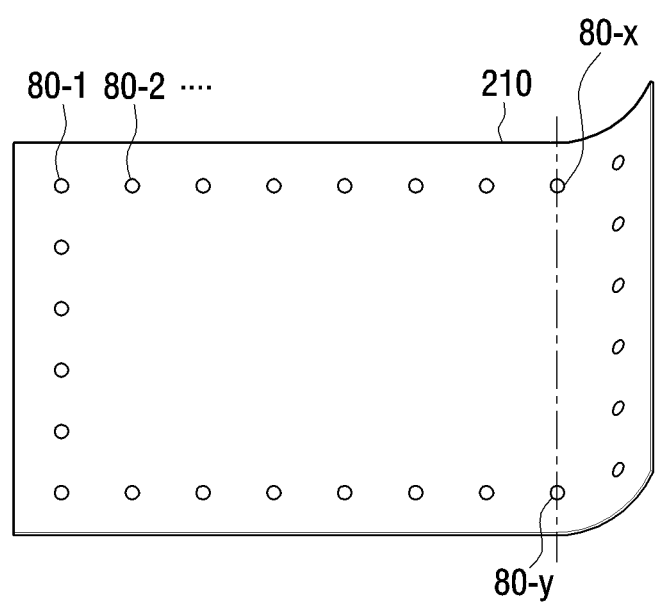

In the state in which the strain gages are arranged as shown in FIG. 19, the user may bend a certain point in an arbitrary direction. Specifically, in response to the right edge being bent as shown in FIG. 20, a force is exerted to strain gages 80-x and 80-y overlapping with a bending line from among strain gages 80-1, 80-2, . . . which are arranged in a horizontal direction. Accordingly, resistance values of the corresponding strain gages 80-x and 80-y increase in comparison with resistance values of the other strain gages. Accordingly, the controller 230 determines a line connecting the two strain gages 80-x and 80-y in which the resistance values are changed, as a bending line.

Figure 21:
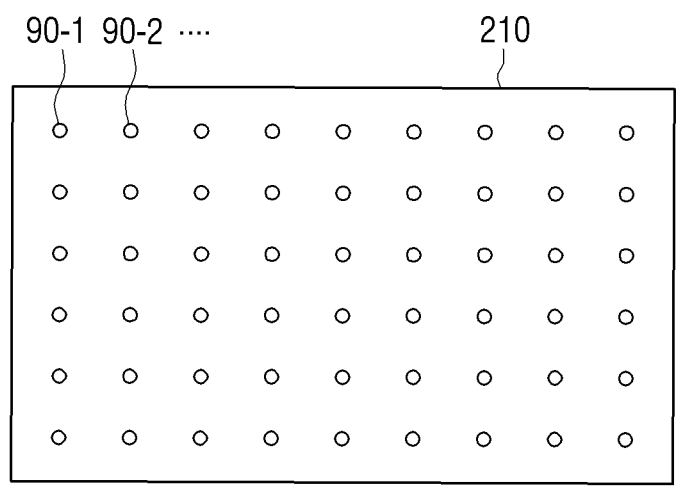
Figure 22:
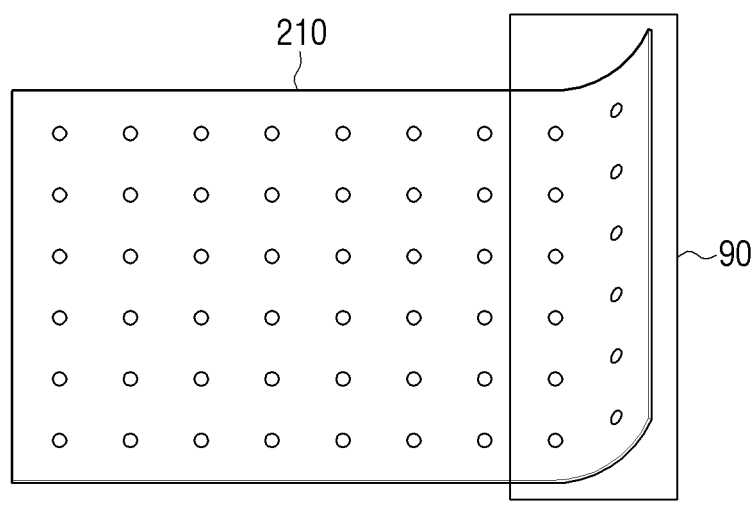

FIGS. 21 and 22 are views illustrating a plurality of strain gages which are arranged on one entire surface of the body 210 at regular intervals in a grid pattern.

In response to the right edge being bent as shown in FIG. 22 in the state in which strain gages 90-1, 90-2, . . . are arranged on the body 210 as shown in FIG. 21, resistance values of the strain gages in a bent area 90 are changed according to a degree of bending. Therefore, the controller 230 may determine the bending area, the bending direction, and the degree of bending based on the resistance value of each strain gage output from the sensor 220.

In addition to the above-described exemplary embodiments, the flexible remote controller 200 may sense the bending direction by using various sensors such as a gyro sensor, a geomagnetic sensor, an acceleration sensor, etc.

Figure 23:
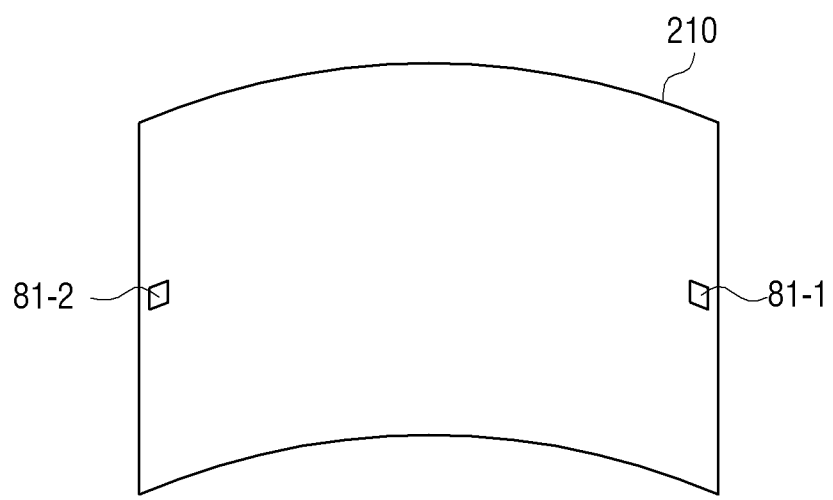
Figure 24:
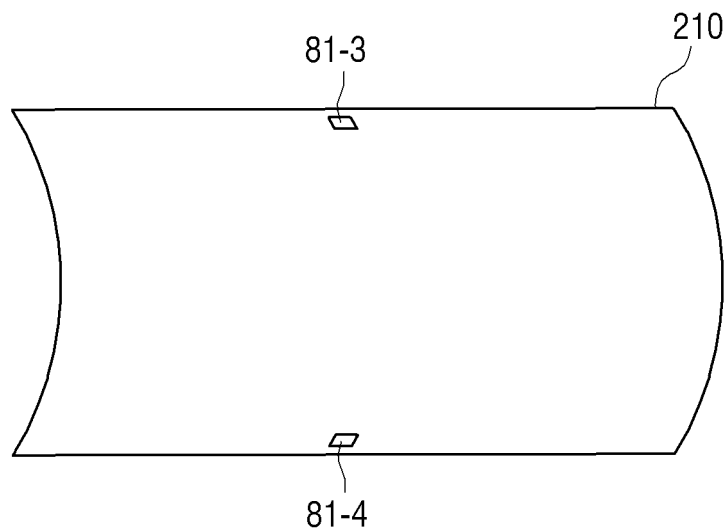

FIGS. 23 and 24 are views illustrating a method for sensing a bending direction by using an acceleration sensor according to an exemplary embodiment. Referring to FIGS. 23 and 24, the flexible remote controller 200 includes a plurality of acceleration sensors 81-1 and 81-2.

The acceleration sensors 81-1 and 81-2 can measure acceleration of a motion and a direction of the acceleration. Specifically, the acceleration sensors 81-1 and 81-2 output a sensing value corresponding to acceleration of gravity which changes according to a slope of an apparatus where those sensors are attached. Accordingly, in response to the body 210 being bent, output values sensed by the acceleration sensors 81-1 and 81-2 which are disposed on opposite edges of the body 210 are changed. The controller 230 calculates a pitch angle and a roll angle by using the output values sensed by the acceleration sensors 81-1 and 81-2. Accordingly, the controller 230 may determine the bending direction based on changes in the pitch angle and the roll angle sensed by the acceleration sensors 81-1 and 81-2.

In FIG. 23, the acceleration sensors 81-1 and 81-2 are disposed on opposite edges in the horizontal direction with reference to the front surface of the body 210. However, the acceleration sensors may be disposed in the vertical direction as shown in FIG. 24. In this case, in response to the body 210 being bent in the vertical direction, the bending direction may be sensed according to measurement values sensed by the acceleration sensors 81-3 and 81-4 in the vertical direction.

In FIGS. 23 and 24, the acceleration sensors are disposed on the left and right edges or the upper and lower edges of the body 210. However, the acceleration sensors may be disposed on all of the left, right, upper and right edges and/or may be disposed on corners.

As described above, the bending direction of the body 210 may be sensed by using a gyro sensor or a geomagnetic sensor besides the acceleration sensor. The gyro sensor refers to a sensor which, in response to a rotational motion occurring, detects an angular velocity by measuring Coriolis' force exerted in a velocity direction of the motion. Based on a measurement value of the gyro sensor, a direction of the rotational motion can be sensed and thus a bending direction can also be sensed. The geomagnetic sensor refers to a sensor which senses azimuth using a 2-axis or 3-axis fluxgate. The geomagnetic sensor disposed on each edge of the body 210 suffers from location movement in response to the edge being bent, and outputs an electric signal corresponding to a change in geomagnetism caused by the location movement. The controller 230 may calculate a yaw angle by using the value output from the geomagnetic sensor. According to a change in the calculated yaw angle, various bending characteristics such as a bending area and a bending direction can be determined.

As described above, the sensor 220 of the flexible remote controller 200 may sense bending by using various kinds of sensors. The above-described configuration of the sensor and the sensing method thereof may be applied to the sensor 210 individually or may be applied in combination.

In the above-described exemplary embodiments, the bending area is determined by the sensor 220 and the degree of bending and the bending direction are determined by the controller 230. However, this is merely an exemplary embodiment. The bending state including the bending area, the degree of bending, and the bending direction may be determined by the sensor 220 by using the information (for example, the resistance value) sensed by the sensor 220 or may be determined by the controller 230, as described above.

The communicator 240 is configured to communicate with the flexible display apparatus 100. Specifically, the communicator 240 may transmit a remote control signal which is generated to control the flexible display apparatus 100 to the flexible display apparatus 100.

In particular, in response to the flexible remote controller 200 being bent, the communicator 240 may transmit bending information corresponding to the bending state to the flexible display apparatus 100 through the remote control signal. Accordingly, the flexible display apparatus 100 may be bent in the shape corresponding to the bending state of the flexible remote controller by using the received bending information.

To achieve this, the communicator 240 may include different hardware and software elements according to a communication method between the flexible remote controller 200 and the flexible display apparatus 100. Specifically, in case that the remote control signal is an IR signal, the communicator 240 may include a hardware element and a software element for IR communication, and, in case that the remote control signal is a Bluetooth signal or a Wi-Fi signal, the communicator 240 may include a hardware element and a software element for each communication. Since a detailed configuration of the communicator 240 is irrelevant to the main features of the present disclosure, a detailed explanation thereof is omitted.

The controller 230 controls an overall operation of the flexible remote controller 200. In particular, in response to bending of the body 210 being sensed by the sensor 220, the controller 230 may control the communicator 240 to transmit the bending information corresponding to the bending state to the flexible display apparatus 100.

Specifically, in response to the flexible remote controller 200 being bent by an external force applied by the user and the bending of the body 210 being sensed by the sensor 220, the controller 230 may determine the bending state of the flexible remote controller 200 by using the values sensed by the sensor 220 and may control the communicator 240 to transmit the bending information including the bending area, the degree of bending, and the bending direction, which is generated based on the determination of the bending state, to the flexible display apparatus 100 through the remote control signal.

In response to the bending state of the body 210 being determined by the sensor 220 and the bending information being generated, the controller 230 may transmit the bending information transmitted from the sensor 220 to the flexible display apparatus 100 through the remote control signal as described above.

As described above, the flexible remote controller 200 according to the exemplary embodiment is made of a flexible material and thus is bendable, and can sense bending through various sensors, determine the bending state of the flexible remote controller 200, and transmit the bending information corresponding to the bending state to the flexible display apparatus 100.

Hereinafter, the flexible display apparatus 100 according to an exemplary embodiment will be explained in detail with reference to the drawings.

Figure 25:
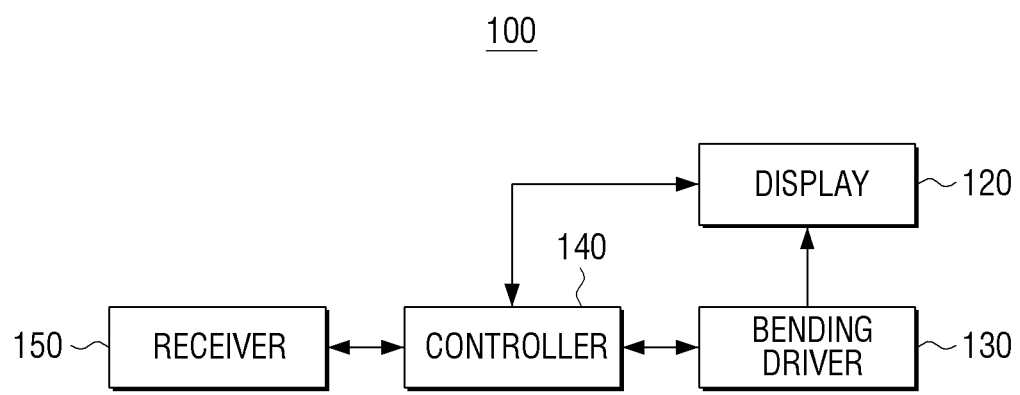
FIG. 25 is a block diagram illustrating a configuration of a flexible display apparatus according to an exemplary embodiment.

FIG. 25 is a block diagram illustrating a configuration of the flexible display apparatus 100 according to an exemplary embodiment. Referring to FIG. 25, the flexible display apparatus 100 includes a display 120, a bending driver 130, a controller 140, and a receiver 150.

The display 120 is configured to display images received from various sources. In particular, the display 120 is made of a flexible material and thus is bendable, and can be bent by the bending driver 130.

The bending driver 130 is an element for bending the display 120. In particular, in response to the bending information generated by bending of the flexible remote controller 200 being received, the bending driver 130 may bend the display 120 in a shape corresponding to the bending state of the remote controller 200 under the control of the controller 140.

To achieve this, the bending driver 130 may include a plurality of piezoelectric elements arranged on a rear surface of the display 120 and a driving circuit to apply a driving signal to each of the plurality of piezoelectric elements. In response to the driving signal being applied by the driving circuit, each of the plurality of piezoelectric elements is deformed in a specific direction according to a polarity of the driving signal and thus bends the display 120.

Hereinafter, configurations of the display 120 and the bending driver 130 and operations thereof will be explained in detail.

Figure 26:
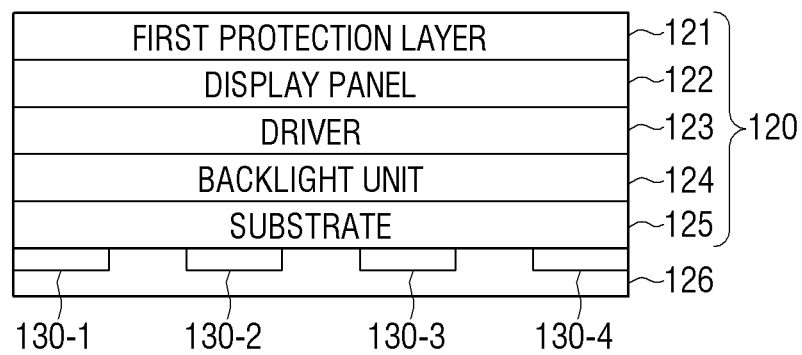
FIG. 26 is a cross section view illustrating configurations of a display and a bending driver of a flexible display apparatus according to an exemplary embodiment.

FIG. 26 is a view illustrating the configurations of the display 120 and the bending driver 130 according to an exemplary embodiment. Referring to FIG. 26, the display 120 includes a first protection layer 121, a display panel 122, a driver 123, a backlight unit 124, and a substrate 125. In addition, the bending driver 130 includes a plurality of piezoelectric elements 130-1 to 130-4 arranged on the rear surface of the display 120 and is covered by a second protection layer 126.

The first protection layer 121 protects the display panel 122. For example, the first protection layer 121 may be made of ZrO, CeO2, or ThO2. The first protection layer 121 may be manufactured as a transparent film and may cover the entire surface of the display panel 122.

The display panel 122 may be implemented by using a liquid crystal display (LCD), an organic light emitting diode (OLED), an electrophoretic display (EPD), an electrochromic display (ECD), a plasma display panel (PDP), etc. When the display panel 122 is embodied by the LCD, the backlight unit 124 is required as shown in FIG. 26. In the backlight unit 124, a light source such as a lamp or an LED is arranged in a direct type or edge type, and provides backlight toward the display panel 122.

The driver 123 drives the display panel 122. Specifically, the driver 123 applies a driving voltage to a plurality of pixels which constitute the display panel 122. The driver 123 may be implemented by using a-si Thin Film Transistor (TFT), a low temperature poly silicon (LTPS) TFT, or an organic TFT (OTFT) and so on. The driver 123 may also be implemented in various forms according to the form of the display panel 122. For instance, the display panel 122 may consist of an organic light emitting substance which includes a plurality of pixel cells, and an electrode layer which covers opposite surfaces of the organic light emitting substance. In this case, the driver 123 may include a plurality of transistors corresponding to the plurality of pixel cells of the display panel 122. In response to an electric signal being applied, each transistor makes the pixel cell connected thereto emit light. Accordingly, an image is displayed on the display panel 122. In addition, a color filter may be further included although not shown. Each element of FIG. 26 may be manufactured using an organic material including carbon or a foil and thus may have flexibility.

The substrate 125 supports the above-described elements. The substrate 125 may be a plastic substrate implemented by using various materials such as polyimide (PI), polycarbonate (PC), polyethyleneterephtalate (PET), polyethersulfone (PES), polythylenenaphthalate (PEN), and fiber reinforced plastic (FRP).

The plurality of piezoelectric elements 130-1 to 130-$n$ are arranged on a lower portion of the substrate 125. The plurality of piezoelectric elements 130-1 to 130-$n$ are disposed away from one another by a predetermined distance.

In FIG. 26, which is a cross section view of the display 120 and the bending driver 130, only four piezoelectric elements 130-1 to 130-4 are illustrated. However, in practice, the piezoelectric elements 130-1 to 130-$n$ are arranged on the entire rear surface of the display 120 at regular intervals as shown in the plane view of FIG. 27.

The piezoelectric elements 130-1 to 130-$n$ are covered by the second protection layer 126. The second protection layer 126 may be made of rubber, plastic, or other flexible materials. Although a space between the piezoelectric elements 130-1 to 130-$n$ is filled by the second protection layer 126 in FIG. 26, the space between the piezoelectric elements 130-1 to 130-$n$ may be an empty space.

Figure 27:
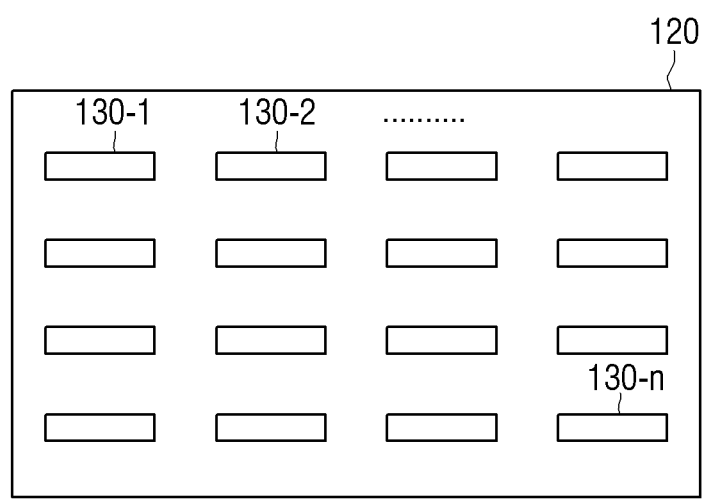
FIG. 27 is a view illustrating an example of arrangement of a plurality of piezoelectric elements constituting a bending driver of a flexible display apparatus according to an exemplary embodiment.

In FIGS. 26 and 27, the plurality of piezoelectric elements 130-1 to 130-$n$ are arranged at regular intervals in a matrix pattern in the vertical and horizontal directions under the substrate 125. However, the number of piezoelectric elements, the locations, and the arrangement pattern are not limited to this and may be changed according to an exemplary embodiment.

Hereinafter, the detailed configuration and operation of the bending driver 130 will be explained with reference to the drawings.

Each of the plurality of piezoelectric elements 130-1 and 130-$n$ includes two different piezoelectric layers arranged one on another. For the convenience of explanation, the two piezoelectric layers are referred to as an upper piezoelectric layer and a lower piezoelectric layer.

The flexible display apparatus 100 uses a piezoelectric effect of each of the plurality of piezoelectric elements 130-1 to 130-$n$. Specifically, in response to a pressure being applied by bending the display 120 where the piezoelectric elements 130-1 and 130-$n$ are provided, each of the piezoelectric elements 130-1 and 130-$n$ causes dielectric polarization due to the pressure and generates an electric signal. This may be referred to as a direct piezoelectric effect or a first piezoelectric effect. To the contrary, in response to an electric field being applied to each of the piezoelectric elements 130-1 to 130-$n$, each of the piezoelectric elements 130-1 to 130-$n$ has its shape deformed due to the electric field. This may be referred to as a converse piezoelectric effect or a second piezoelectric effect. These effects are called a piezoelectric effect. According to an exemplary embodiment, the flexible display apparatus 100 may deform the shape of the display 120 by using the second piezoelectric effect of the piezoelectric elements of the flexible display apparatus 100.

Each of the piezoelectric elements 130-1 to 130-$n$ may be implemented in various types such as a unimorph type, a bimorph type, a multi-layered type, etc. The unimorph type refers to a piezoelectric construction in which a single piezoelectric layer is stacked on a disk type metal layer. The bimorph type refers to a piezoelectric construction in which two piezoelectric layers are stacked one on another. The multi-layered type refers to a piezoelectric construction that is formed by printing a metal electrode material on a ceramics sheet, compressing several sheets, including an electrode in the sheets, and sintering.

Figure 28:
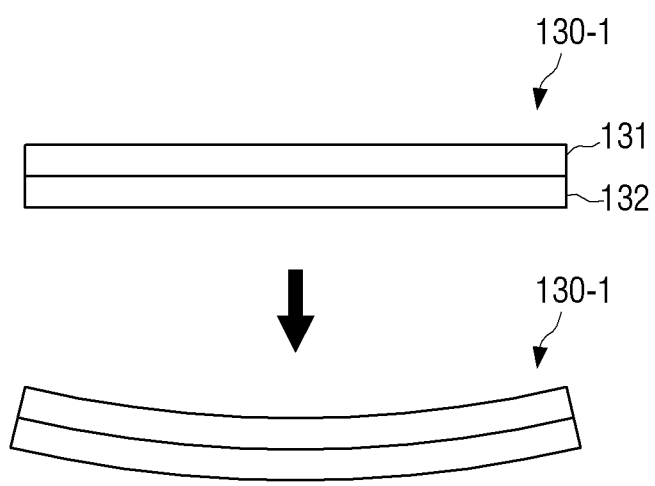
FIGS. 28 to 39 are views illustrating a detailed configuration and an operation of a bending driver of a flexible display apparatus according to an exemplary embodiment.

FIG. 28 is a cross section view of a unimorph type piezoelectric element. Referring to FIG. 28, the unimorph type piezoelectric element 130-1 includes a metal layer 132 and a piezoelectric layer 131 stacked on a surface of the metal layer 132. The piezoelectric layer 131 may be made of a piezoelectric ceramics or a piezoelectric polymer. The piezoelectric ceramics may use various kinds of materials such as PZT, PbTiO3, BaTiO3, etc.

In response to a driving signal of a first polarity being applied to the piezoelectric layer 131, the piezoelectric layer 131 is deformed, that is, has its edge areas ascend and has its center area descend, as shown in FIG. 28. In response to a driving signal of a second polarity, which is opposite to the first polarity being applied, the piezoelectric layer 131 is deformed in a reverse direction.

Figure 29:
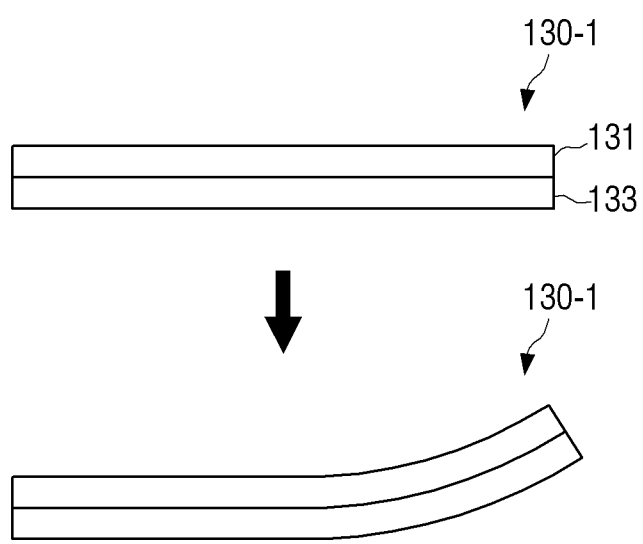

FIG. 29 is a cross section view of a bimorph type piezoelectric element. Referring to FIG. 29, the bimorph type piezoelectric element 130-1 includes an upper piezoelectric layer 131 and a lower piezoelectric layer 133. In response to the driving signal of the first polarity being applied, each of the upper piezoelectric layer 131 and the lower piezoelectric layer 133 is stretched, and, in response to the driving signal of the second polarity being applied, each of the upper piezoelectric layer 131 and the lower piezoelectric layer 133 is contracted. The first polarity may be a + polarity and the second polarity may be a − polarity. In response to the upper piezoelectric layer 131 being stretched and the lower piezoelectric layer 133 being contracted, the piezoelectric element 130-1 is bent toward the lower piezoelectric layer 133. To the contrary, in response to the upper piezoelectric layer 131 being contracted and the lower piezoelectric layer 133 being stretched, the piezoelectric element 130-1 is bent toward the upper piezoelectric layer 131.

Figure 30:
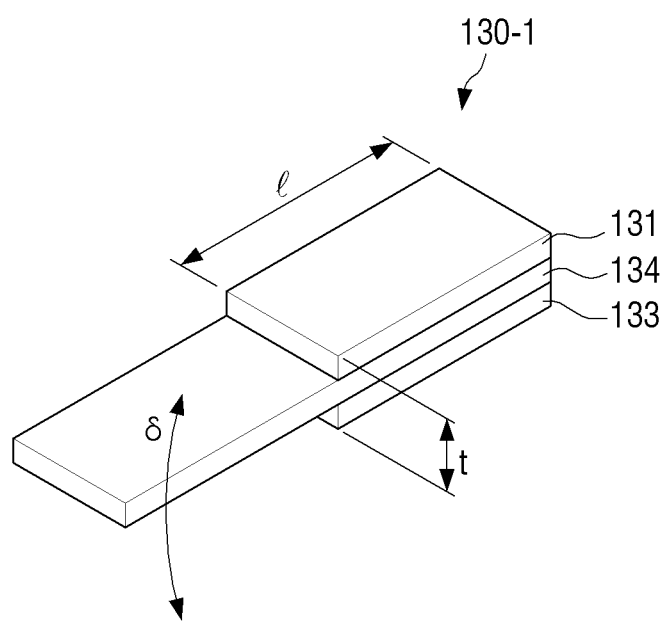

FIG. 30 illustrates another exemplary embodiment of the bimorph type piezoelectric element. Referring to FIG. 30, an intermediate layer 134 is provided between the upper piezoelectric layer 131 and the lower piezoelectric layer 133 in the piezoelectric element 130-1.

The intermediate layer 134 may be made of an elastic material having flexibility. The intermediate layer 134 may be implemented as a rectangular parallelepiped having a thin thickness. The upper piezoelectric layer 131 is stacked on an upper surface of the intermediate layer 134 and the lower piezoelectric layer 133 is stacked on a lower surface of the intermediate layer 134. The upper piezoelectric layer 131 and the lower piezoelectric layer 133 may be made of various piezoelectric materials as described above. Referring to FIG. 30, the upper piezoelectric layer 131 and the lower piezoelectric layer 133 may be formed to cover only a part of the intermediate layer 134. That is, the intermediate layer 134 may be implemented to have a relatively longer length. The lengths of the piezoelectric layers 131 and 133 and the intermediate layer 134 may be determined based on data measured through an experiment.

For example, in the construction of FIG. 30, a frequency and a displacement characteristic may be measured according to a length of the intermediate layer 134 through an experiment as follows:

TABLE 1

| Intermediate Layer (mm) | 80 | 90 | 100 | 110 | 120 |
|---|---|---|---|---|---|
| Piezoelectric Layer (mm) | 30 | 30 | 30 | 30 | 30 |
| Frequency (Hz) | 40.621 | 32.389 | 24.845 | 20.045 | 19.875 |
| Displacement (mm) | 8.64 | 12.92 | 13.78 | 6.44 | 6.545 |

Referring to Table 1, respective first ends of the piezoelectric layers 131 and 133 and the intermediate layer 134 are aligned with one another, and the length of the piezoelectric layers 131 and 133 is fixed to 30 mm. In this state, the displacement is measured with varying lengths of the intermediate layer 134, that is, 80, 90, 100, 110, 120 mm. According to a result of the experiment, the maximum displacement is measured from the intermediate layer 134 of 100 mm rather than the longest intermediate layer 134 of 120 mm. The displacement refers to a width δ by which the other end of the intermediate layer 134 is deformed in a vertical direction.

The displacement may be represented by Equation 1:

$$\delta = k \cdot d_{31} \cdot V \cdot l^2 / t^2 \qquad \text{Equation 1}$$

where δ is the displacement, k is an integer, $d_{31}$ is a piezoelectric constant, V is an applied voltage, l is a length of a piezoelectric layer, and t is a thickness. According to Equation 1, the displacement δ increases in proportion to the applied voltage, that is, the driving signal.

In FIG. 30, the intermediate layer 134 is longer than the piezoelectric layers 131 and 133. However, the intermediate layer 134 may have the same length as that of the piezoelectric layers 131 and 133. In addition, the bending direction of the piezoelectric element 130-1 may be determined by a voltage difference between the first driving signal applied to the upper piezoelectric layer 131 and the second driving signal applied to the lower piezoelectric layer 133.

Figure 31:
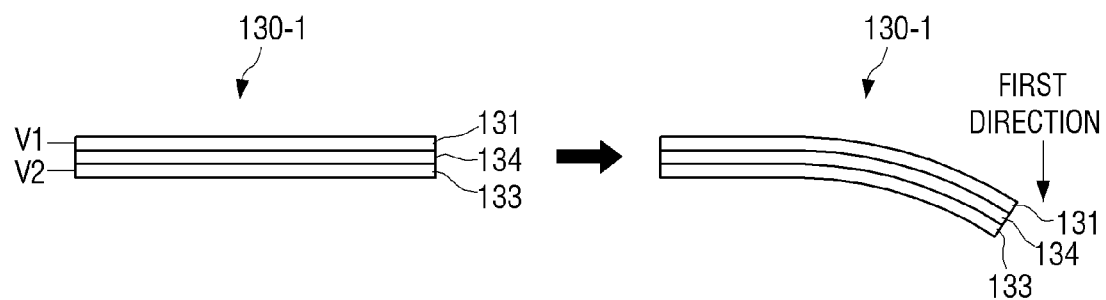
Figure 32:
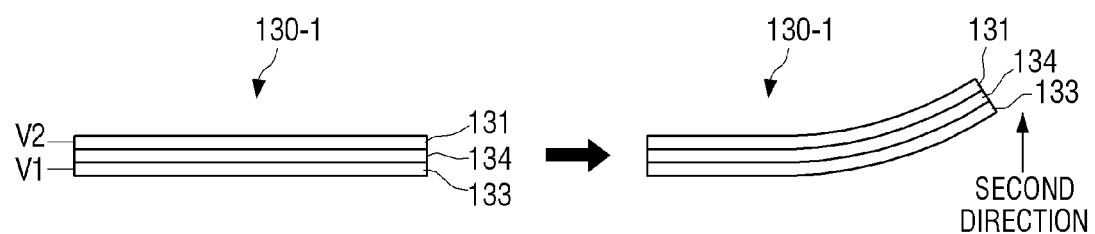

FIGS. 31 and 32 are views illustrating a method for adjusting the bending direction of the piezoelectric element 130-1 that is implemented to include the upper piezoelectric layer 131, the intermediate layer 134, and the lower piezoelectric layer 133 of the same length, according to an exemplary embodiment.

First, in FIG. 31, the first driving signal V1 is applied to the upper piezoelectric layer 131 and the second driving signal V2 is applied to the lower piezoelectric layer 133. When V1 is the + polarity and V2 is the − polarity, the upper piezoelectric layer 131 is stretched and the lower piezoelectric layer 133 is contracted. Accordingly, the piezoelectric element 130-1 is bent in a first direction. When V1 and V2 are the same polarity but V1 is greater than V2, the piezoelectric element 130-1 may be bent in the first direction.

In FIGS. 32, V1 and V2 are applied on the contrary to FIG. 31. Referring to FIG. 32, the piezoelectric element 130-1 is bent in a second direction opposite to the first direction.

In response to the piezoelectric element 130-1 being bent as shown in FIGS. 31 and 32, the display 120 to which the piezoelectric element 130-1 is attached is also bent.

Figure 33:
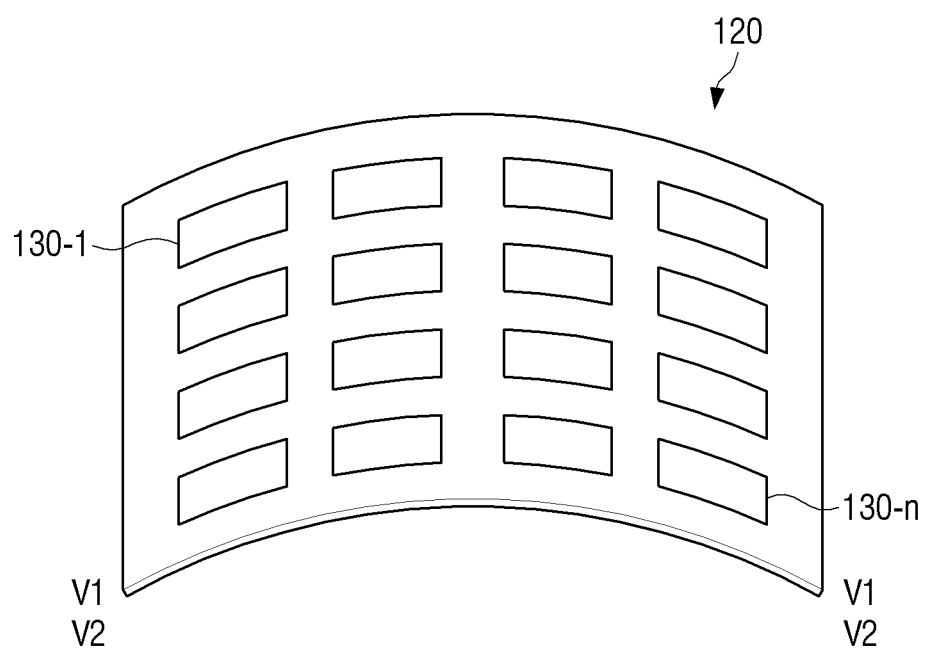

FIG. 33 illustrates a state in which the display 120 is bent in the first direction in response to all of the piezoelectric elements 130-1 to 130-n attached to the display 120 being bent in the first direction, as shown in FIG. 31.

Figure 34:
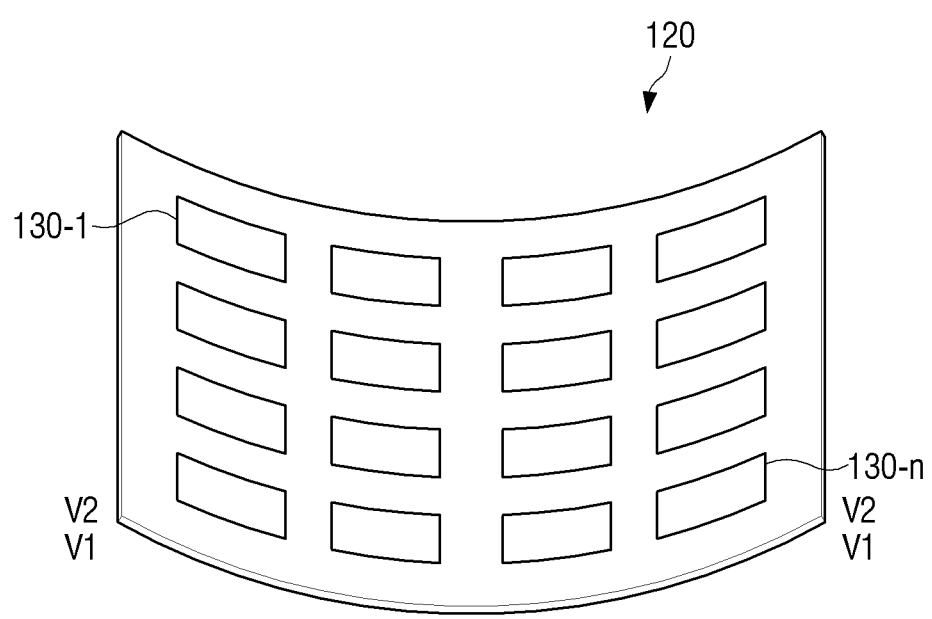

FIG. 34 illustrates a state in which the display 120 is bent in the second direction in response to all of the piezoelectric elements 130-1 to 130-n attached to the display 120 being bent in the second direction as shown in FIG. 32.

In response to the same driving signal being applied to the upper piezoelectric layer 131 and the lower piezoelectric layer 133, the upper piezoelectric layer 131 and the lower piezoelectric layer 133 generate the same piezoelectric effect.

Figure 35:
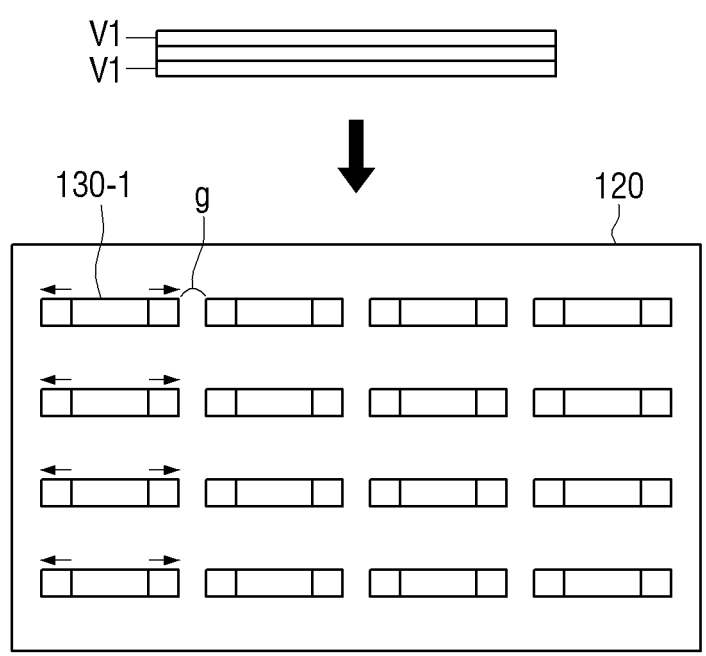

FIG. 35 illustrates the state in which the same driving signal is applied. Referring to FIG. 35, in response to the first driving signal V1 of the + polarity being applied to the upper piezoelectric layer 131 and the lower piezoelectric layer 133, the piezoelectric layers 131 and 133 maintain equilibrium and are stretched in a lengthwise direction. Accordingly, a gap g between the piezoelectric elements is reduced as shown in FIG. 35 and thus a compression effect occurs, so that the display 120 can be rigidified.

Hereinafter, various exemplary embodiments of a configuration for applying the driving signal to the plurality of piezoelectric elements 130-1 to 130-n, that is, a driving circuit, will be explained with reference to FIGS. 36 to 39.

Figure 36:
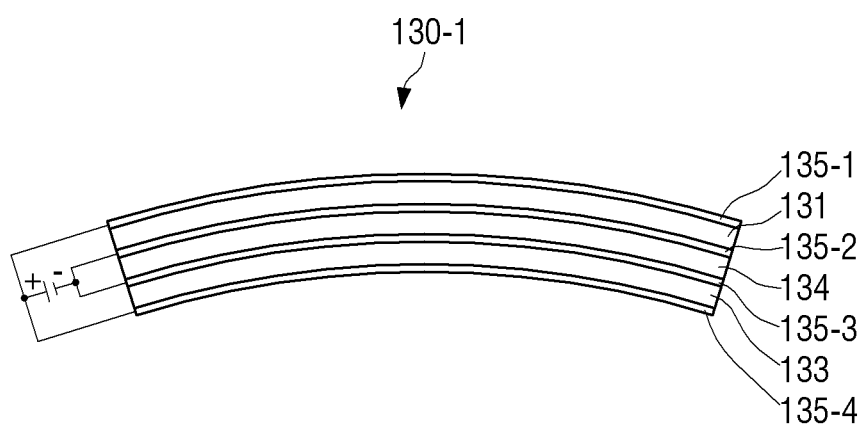
Figure 37:
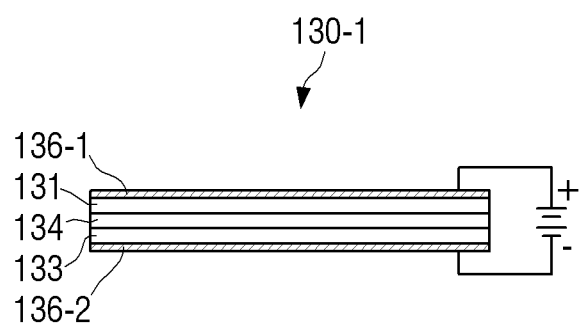

FIGS. 36 and 37 are views illustrating various exemplary embodiments of a configuration for applying the driving signal to the bimorph type piezoelectric element.

Referring to FIG. 36, the piezoelectric element 130-1 includes the upper piezoelectric layer 131, the intermediate layer 134, and the lower piezoelectric layer 133, and further includes a first electrode 135-1 disposed on an upper surface of the upper piezoelectric layer 131, a second electrode 135-2 disposed between the upper piezoelectric layer 131 and the intermediate layer 134, a third electrode 135-3 disposed between the intermediate layer 134 and the lower piezoelectric layer 133, and a fourth electrode 135-4 disposed on a lower surface of the lower piezoelectric layer 133.

In response to a + voltage being applied to the first electrode 135-1 and the fourth electrode 135-4 and a − voltage being applied to the second electrode 135-2 and the third electrode 135-3 as shown in FIG. 36, the electric field of the + polarity is formed in the upper piezoelectric layer 131. Accordingly, the piezoelectric material in the upper piezoelectric layer 131 is polarized according to the electric field direction and the length of a crystal is stretched. That is, the upper piezoelectric layer 131 is stretched in the lengthwise direction. On the other hand, the electric field of the − polarity is formed in the lower piezoelectric layer 133. Accordingly, the lower piezoelectric layer 133 is contracted in the lengthwise direction. As a result, the piezoelectric element 130-1 is bent toward the lower piezoelectric layer 133 as shown in FIG. 36.

FIG. 37 illustrates the piezoelectric element 130-1 including electrodes disposed on an upper portion and a lower portion thereof. Referring to FIG. 37, the piezoelectric element 130-1 includes the upper piezoelectric layer 131, the intermediate layer 134, and the lower piezoelectric layer 133, and further includes a first electrode 136-1 disposed on the upper surface of the upper piezoelectric layer 131 and a second electrode 136-2 disposed on the lower surface of the lower piezoelectric layer 133. Accordingly, in response to a + signal being applied to the first electrode 136-1 and a − signal being applied to the second electrode 136-2 as shown in FIG. 37, the upper piezoelectric layer 131 is stretched and the lower piezoelectric layer 133 is contracted, and thus the piezoelectric element 130-1 is bent downwardly.

An electrode pattern may be provided to apply the driving signals to the upper piezoelectric layer and the lower piezoelectric layer individually. The electrode pattern refers to a pattern for electrically connecting electrodes connected to the upper piezoelectric layer and the lower piezoelectric layer to a power circuit in the flexible display apparatus 100. The electrode pattern may be formed on a lower portion of the above-described substrate 125 or may be provided in the second protection layer 126. In addition, when the plurality of piezoelectric elements 130-1 to 130-n are embedded in the substrate 125, the electrode pattern may be provided in the substrate 125.

Figure 38:
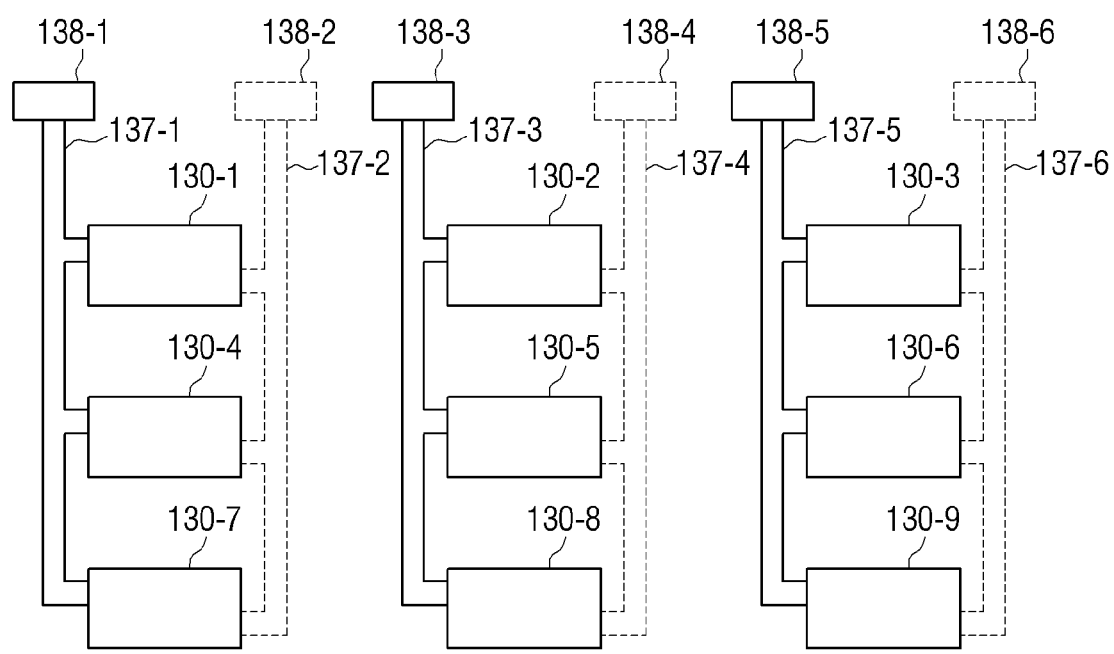

FIG. 38 illustrates an example of the electrode pattern according to an exemplary embodiment. Referring to FIG. 38, the bending driver 130 includes upper electrode patterns 137-1, 137-3, and 137-5 connected with the upper piezoelectric layers 131 of the piezoelectric elements 130-1 to 130-n, and lower electrode patterns 137-2, 137-4, and 137-6 connected with the lower piezoelectric layers 133 of the piezoelectric elements 130-1 to 130-n.

The upper electrode patterns 137-1, 137-3, and 137-5 and the lower electrode patterns 137-2, 137-4, and 137-6 commonly connect the piezoelectric elements arranged in the same column. That is, the first upper electrode pattern 137-1 is commonly connected with the upper piezoelectric layers 131 of the first, fourth, and seventh piezoelectric elements 130-1, 130-4, and 130-7 arranged in the first column. In addition, the first lower electrode pattern 137-2 is commonly connected with the lower piezoelectric layers 133 of the first, fourth, and seventh piezoelectric elements 130-1, 130-4, and 130-7 arranged in the same column. The piezoelectric elements arranged in the other columns are commonly connected with one another by the upper and lower electrode patterns of each column, column by column.

The respective upper electrode patterns 137-1, 137-3, and 137-5 and lower electrode patterns 137-2, 137-4, and 137-6 are connected to electrode pads 138-1 to 138-6. Accordingly, in response to the driving signal being applied to one electrode pad, the same driving signal is provided to the piezoelectric elements commonly connected with the electrode pattern to which the electrode pad is connected.

FIG. 38 illustrates the piezoelectric element of the multi-layered structure. In this state, the upper electrode patterns 137-1, 137-3, and 137-5 are formed on the same layer as that of the upper piezoelectric layer 131 and the lower electrode patterns 137-2, 137-4, and 137-6 are formed on the same layer as that of the lower piezoelectric layer 133. That is, the upper electrode patterns 137-1, 137-3, and 137-5 are formed on the higher layer than that of the lower electrode patterns 137-2, 137-4, and 137-6. In FIG. 38, the upper electrode patterns 137-1, 137-3, and 137-5 are illustrated by solid lines and the lower electrode patterns 137-2, 137-4, and 137-6 are illustrated by dashed lines. A penetrating electrode penetrating through the layers may be provided when necessary.

In FIG. 38, the electrode patterns for driving the plurality of piezoelectric elements arranged in the matrix pattern on the column basis is illustrated. However, according to another exemplary embodiment, the plurality of piezoelectric elements may be driven on a row basis. In this case, an upper electrode pattern (not shown) to commonly connect the upper piezoelectric layers of the piezoelectric elements arranged in a row (for example, the first, second, and third piezoelectric elements), and a lower electrode pattern (not shown) to commonly connect the lower piezoelectric layers of the piezoelectric elements arranged in the row may be further included. Since the electrode patterns on the row basis can be easily understood from the upper and lower electrode patterns on the column basis, illustration and explanation of the electrode patterns on the row basis are omitted. In addition, only the three upper electrode patterns are illustrated in FIG. 38, but the number of upper electrode patterns may vary according to the number of piezoelectric elements.

In FIG. 38, the plurality of piezoelectric elements are driven in the same way on the column basis or on the row basis. However, the plurality of piezoelectric elements may be driven on a basis of each piezoelectric element.

Figure 39:
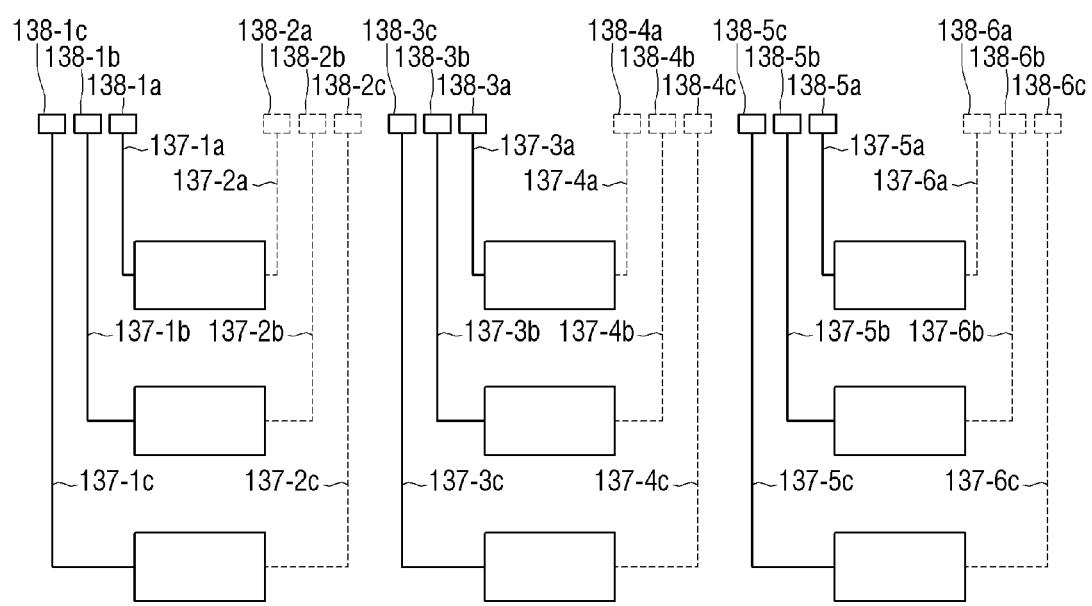

FIG. 39 illustrates an exemplary embodiment of the electrode pattern for driving the plurality of piezoelectric elements on the basis of each piezoelectric element.

Referring to FIG. 39, a plurality of upper electrode patterns 137-1a, 137-1b, 137-1c, 137-3a, 137-3b, 137-3c, 137-5a, 137-5b, and 137-5c are individually connected to the upper piezoelectric layers of the respective piezoelectric elements. In addition, a plurality of lower electrode patterns 137-2a, 137-2b, 137-2c, 137-4a, 137-4b, 137-4c, 137-6a, 137-6b, and 137-6c are individually connected to the lower piezoelectric layers of the respective piezoelectric elements. In addition, the respective upper electrode patterns and lower electrode patterns are connected to corresponding electrode pads 138-1a, 138-1b, 138-1c, 138-2a, 138-2b, 138-2c, 138-3a, 138-3b, 138-3c, 138-4a, 138-4b, 138-4c, 138-5a, 138-5b, 138-5c, 138-6a, 138-6b, and 138-6c. The flexible display apparatus 100 applies a driving signal to electrode pads connected with piezoelectric elements of a location to be deformed from among the electrode pads, thereby deforming the shape of the display 120 as desired.

As described above, the flexible display apparatus 100 can bend the display 120 in a desired shape by means of the configurations of the display 120 and the bending driver 130 according to the above-described exemplary embodiment. An exemplary embodiment of such a bending operation will be explained in detail below.

The receiver 150 is configured to receive a remote control signal from the flexible remote controller 200. In particular, the receiver 150 may receive a remote control signal including bending information corresponding to a bending state of the flexible remote controller 200.

To achieve this, the receiver 150 may include different hardware and software elements according to a communication method with the flexible remote controller 200. Specifically, the receiver 150 may include a hardware element and a software element for IR communication in case that the remote control signal of the flexible remote controller 200 is an IR signal, and may include a hardware element and a software element for each communication in case that the remote control signal is a Bluetooth signal or a Wi-Fi signal. Since a detailed configuration of the receiver 150 is irrelevant to the main features of the present disclosure, a detailed description thereof is omitted.

The controller 140 controls an overall operation of the flexible display apparatus 100. In particular, in response to the remote control signal including the bending information being received from the flexible remote controller 200 through the receiver 150, the controller 140 may control the bending driver 130 to bend the display 120 in a shape corresponding to the bending state of the flexible remote controller 200 by using the received bending information.

In addition, the controller 140 may maintain the bending state of the display 120 or unbend the display 120 according to a bending holding time of the flexible remote controller 200.

Specifically, according to an exemplary embodiment, in response to the flexible remote controller 200 being bent and the bending information being received through the receiver 150, the controller 140 may control the bending driver 130 to bend the display 120 in the shape corresponding to the bending state of the flexible remote controller 200 according to the bending information. In this case, in response to the flexible remote controller 200 being unbent within a predetermined threshold time, the controller 140 controls the bending driver 130 to unbend the display 120, and, in response to the flexible remote controller 200 being unbent after the threshold time elapses, the controller 140 controls the bending driver 130 to maintain the bending state of the display 120.

In addition, in response to the flexible remote controller 200 being re-bent in a predetermined shape and corresponding bending information being received through the receiver 150 while the bending state of the display 120 is maintained, the controller 140 may control the bending driver 150 to unbend the display 120.

According to another exemplary embodiment, in response to the bending information being received from the flexible remote controller 200, the controller 140 may not directly bend the display 120 and may count a bending time of the flexible remote controller 200. In response to the counted bending time exceeding the predetermined threshold time, the controller 140 may control the bending driver 130 to bend the display 120.

The controller 140 may control the display 120 to display a guide User Interface (UI) regarding the method for bending or unbending the display 120.

Figure 40:
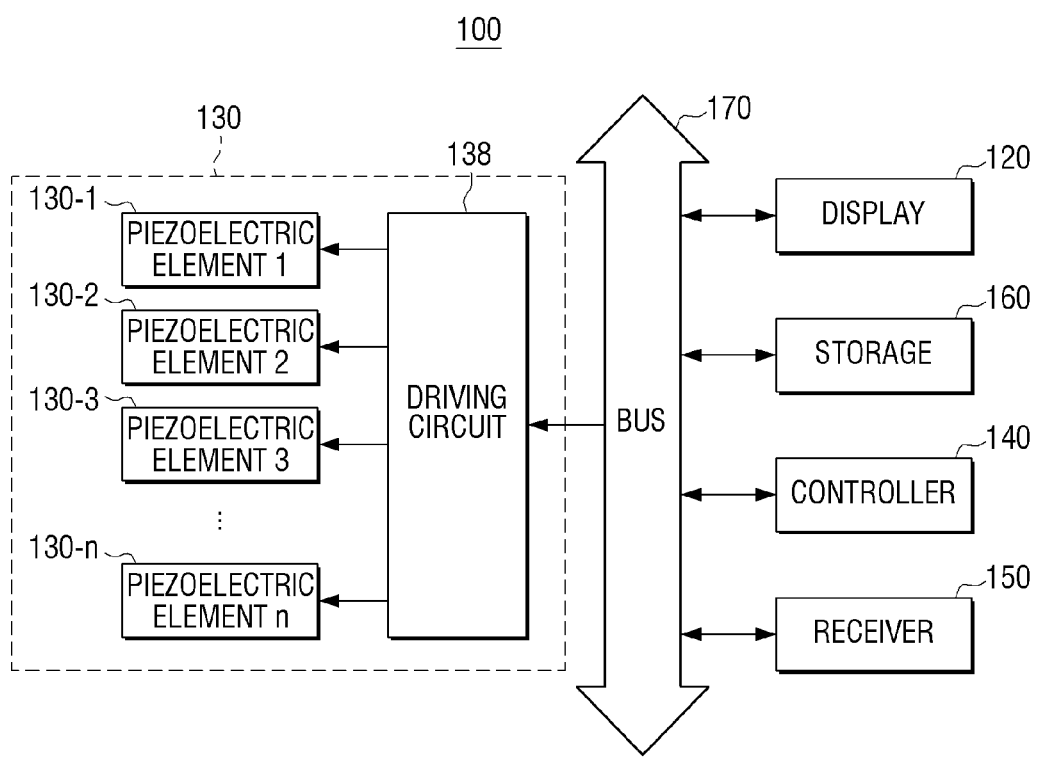
FIG. 40 is a block diagram illustrating a more detailed configuration of a flexible display apparatus according to an exemplary embodiment.

FIG. 40 is a block diagram illustrating a detailed configuration of the flexible display apparatus 100 according to an exemplary embodiment. Referring to FIG. 40, the flexible display apparatus 100 includes a plurality of piezoelectric elements 130-1 to 130-*n*, a display 120, a bending driver 130, a controller 140, a receiver 150, a storage 160, and a bus 170.

Since the configurations and driving methods of the plurality of piezoelectric elements 130-1 to 130-*n* and the bending driver 130 have been described above, a redundant explanation is omitted.

The display 120 is made of a flexible material and performs various bending operations and display operations under the control of the controller 140.

A driving circuit 138 may generate driving signals of various sizes and polarities by using power supplied from a battery (not shown). The driving signal may be generated in the form of a pulse signal.

The storage 160 stores an operating system (OS) for controlling the operation of the flexible display apparatus 100, applications, and various data. The controller 140 may be driven by the OS stored in the storage 160 and may execute various applications.

In particular, the storage 160 may store mapping data on a bending area, a degree of bending, and a bending direction of the display 120 corresponding to a bending area, a degree of bending, and a bending direction of the flexible remote controller 200, so that the display 120 can be bent in a shape corresponding to a bending state of the flexible remote controller 200 according to the bending information of the flexible remote controller 200.

In addition, the storage 160 may store an application for displaying a UI regarding the method for bending or unbending the display 120, and may store data on the predetermined threshold time, which is a reference for maintaining the bending state or for unbending from the best state, and data on the predetermined shape of the flexible remote controller 200 for unbending the display 120.

The bus 170 is configured to transmit and receive data and control signals between the elements of the flexible display apparatus 100. The bus 170 includes an address bus, a data bus, a control bus, etc. The address bus is a bus for transmitting and receiving address information such as a memory address, and the data bus is a bus system that connects the controller 140, the storage 160, and other input and output devices in order to exchange data. The control bus refers to a bus system that is used to transmit and receive various control signals of the controller 140, the storage 160, or other elements. The control signal may include a memory synchronization signal, an input and output synchronization signal, a driving control signal, a Central Processing Unit (CPU) state signal, interrupt request and permission signals, a clock signal, etc.

The receiver 150 is configured to receive signals from the flexible remote controller 200. In particular, the receiver 150 may receive a remote control signal including bending information corresponding to a bending state of the flexible remote controller 200.

The controller 140 controls an overall operation of the flexible display apparatus 100 according to a user manipulation. Specifically, in response to a turn-on command being input to the flexible display apparatus 100, the controller 140 executes an initialization program, boots the flexible display apparatus 100, and displays a desktop screen through the display 120. The desktop screen may display icons regarding various functions, applications, and folders. In response to one of the icons being selected by the user, the controller 140 may perform an operation corresponding to the selected icon.

In particular, in response to the remote control signal including bending information being received from the flexible remote controller 200 through the receiver 150, the controller 140 may read out the mapping information on the bending of the display 120 corresponding to the bending information of the flexible remote controller 200 from the storage 160, and may control the bending driver 130 to apply a driving signal to at least one of the plurality of piezoelectric elements 130-1 to 130-*n* according to the mapping information. Specifically, the controller 140 provides an address signal designating a piezoelectric element to be driven from among the piezoelectric elements 130-1 to 130-*n* to the bending driver 130 through the address bus, and provides a direction signal designating a driving order to the bending driver 130 through the control bus.

The bending driver 130 applies the driving signal to the piezoelectric element designated by the address signal in sequence according to the direction signal. The bending driver 130 may determine a driving time of each piezoelectric element with reference to the clock signal.

The piezoelectric elements to which the driving signals are applied are bent in a predetermined direction according to characteristics of the driving signals, and accordingly, an area of the display 120 where the corresponding piezoelectric elements are disposed is also bent. As a result, the display 120 is deformed in a shape corresponding to the bending state of the flexible remote controller 200 according to the bending information received from the flexible remote controller 200.

As described above, the piezoelectric elements 130-1 to 130-*n* may be arranged on the rear surface of the display 120 in various patterns. The controller 140 may classify the plurality of piezoelectric elements 130-1 to 130-*n* into a plurality of groups with reference to a location of each piezoelectric element 130-1 to 130-*n* in the entire area of the flexible display apparatus 100. For example, the piezoelectric elements 130-1 to 130-*n* arranged in a plurality of rows and columns as shown in FIG. 38 may be grouped on the row basis or column basis. The controller 140 may apply a different driving signal to each group and may control the bending driver 130 to locally bend the shape of the display 120 in each area.

Accordingly, when the piezoelectric elements are arranged as shown in FIG. 38, in order to bend the left edge area of the display 120 in the first direction or second direction, the controller 140 controls the bending driver 130 to drive the piezoelectric elements 130-1, 130-4, and 130-7 arranged in the first column by applying the driving signal to the first and second electrode pads 138-1 and 138-2. Accordingly, the piezoelectric elements 130-1, 130-4, and 130-7 in the first column are bent in the same direction and thus the left edge area of the display 120 where those piezoelectric elements 130-1, 130-4, and 130-7 are arranged is bent.

Figure 41:
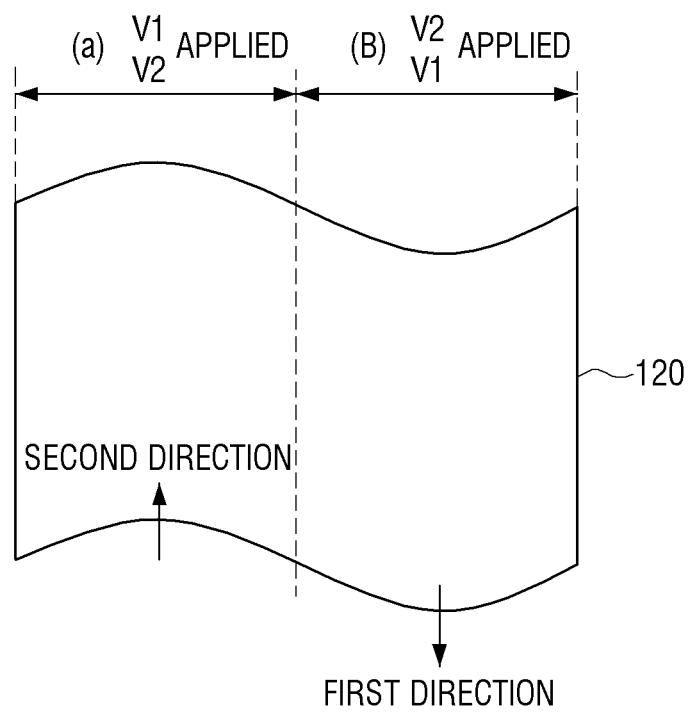

FIGS. 41 and 42 are views illustrating an exemplary embodiment of bending of the display 120.

FIG. 41 illustrates an example of different deformations of the display 120 in each area, according to an exemplary embodiment. In response to the body 210 of the flexible remote controller 200 being bent in the same shape as that of the flexible display apparatus 100 shown in FIG. 41 and a remote control signal including bending information of the flexible remote controller 200 being received through the receiver 150, the controller 130 divides the entire area of the display 120 into an (a) area and a (b) area. The controller 140 controls the bending driver 130 to apply V1 to the upper piezoelectric layers and apply V2 to the lower piezoelectric layers in the piezoelectric elements arranged in the (a) area, and to apply V2 to the upper piezoelectric layers and apply V1 to the lower piezoelectric layers in the piezoelectric elements arranged in the (b) area. Accordingly, the (a) area is bent in the second direction and the (b) area is bent in the first direction.

FIG. 42 illustrates an example of a method for dividing the area of the display 120 into three areas and locally deforming the areas, according to an exemplary embodiment. In response to the body 210 of the flexible remote controller 200 being bent in the same shape as that of the flexible display apparatus 100 shown in FIG. 42 and a remote control signal including bending information of the flexible remote controller 200 being received through the receiver 150, the controller 140 divides the entire area of the display 120 into an (a) area, a (b) area, and a (c) area. The controller 140 controls the bending driver 130 to apply V2 to the upper piezoelectric layers and apply V1 to the lower piezoelectric layers in the piezoelectric elements arranged in the (a) area, to apply V1 to the upper and lower piezoelectric layers in the piezoelectric elements arranged in the (b) area, and apply V1 to the upper piezoelectric layers and apply V2 to the lower piezoelectric layers in the piezoelectric elements arranged in the (c) area. Accordingly, the (a) area is bent in the first direction, the (b) area maintains equilibrium and is rigidified, and the (c) area is bent in the second direction.

As described above, the controller 140 may control the bending driver 130 to bend the display 120 in the shape corresponding to the bending state of the flexible remote controller 200 according to the bending information received from the flexible remote controller 200.

The flexible remote controller 200 may control the flexible display apparatus 100 even in the bent state according to an exemplary embodiment. However, the flexible remote controller 200 may be implemented to control the flexible display apparatus 100 in an unbent state for the convenience of user manipulation.

According to an exemplary embodiment, the controller 140 of the flexible display apparatus 100 may control the bending driver 130 to maintain the bending state of the display 120 only in response to the bending state of the flexible remote controller 200 being maintained for a predetermined threshold time.

That is, in response to the flexible remote controller 200 being bent and the remote control signal including bending information being received through the receiver 150, the controller 140 may control the bending driver 130 to bend the display 120 in the shape corresponding to the bending state of the flexible remote controller 200. In this case, in response to the flexible remote controller 200 being unbent within a predetermined threshold time, the controller 140 may control the bending driver 130 to unbend the display 120, and, in response to the flexible remote controller 200 being unbent after the predetermined threshold time elapses, the controller 140 may control the bending driver 130 to maintain the bending state of the display 120.

In addition, in response to the flexible remote controller 200 being re-bent in a predetermined shape while the bending of the display 120 is maintained, the controller 140 may control the bending driver 130 to unbend the display 120.

Figure 43:
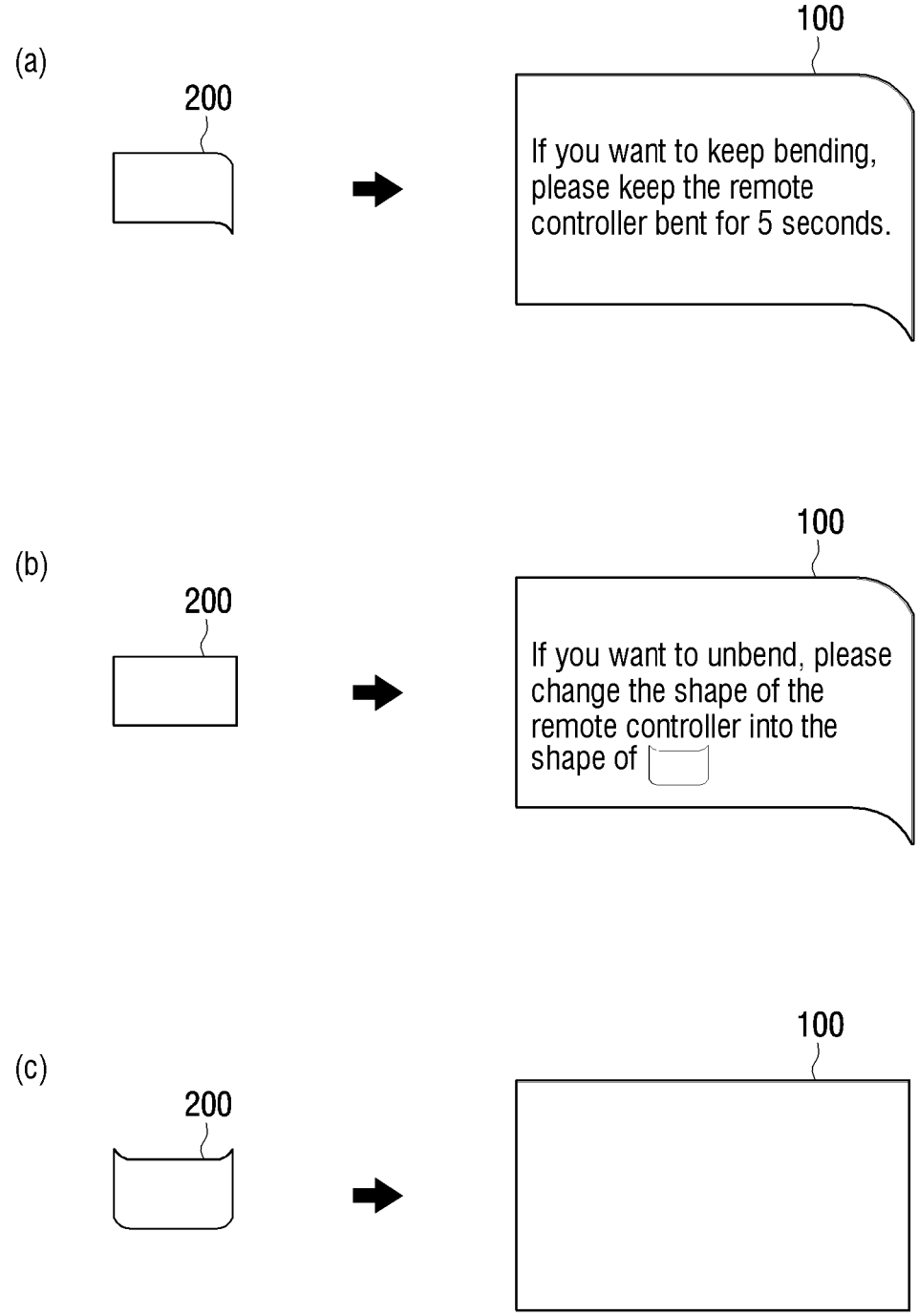
FIGS. 43 and 44 are views illustrating a method for bending a flexible display apparatus and an example of a guide User Interface (UI) thereof according to an exemplary embodiment.

For example, referring to FIG. 43, when the flexible remote controller 200 is bent and the flexible display apparatus 100 is bent in the corresponding shape as shown in view (a) of FIG. 43, the controller 140 determines whether the flexible remote controller 200 is bent for a predetermined threshold time, that is, 5 seconds. According to one exemplary embodiment, in response to the flexible remote controller 200 being unbent before 5 seconds elapse, a remote control signal including bending information on the unbent state of the flexible remote controller 200 is received through the receiver 150. Accordingly, the controller 140 unbends the flexible display apparatus 100. However, in response to the bending state of the remote controller 200 being maintained for more than 5 seconds, the bending state of the flexible display apparatus 100 is maintained even when the flexible remote controller 200 is unbent afterward, as shown in view (b) of FIG. 43.

In addition, in response to the flexible remote controller 200 being re-bent in a predetermined shape as shown in view (c) of FIG. 43 while the bending state of the flexible display apparatus 100 is maintained as shown in view (b) of FIG. 43, a remote control signal including bending information on the predetermined shape of the flexible remote controller 200 is received through the receiver 150. In response the received bending information being consistent with data on the predetermined shape of the flexible remote controller 200 for unbending the display 120 that is stored in the storage 160, the controller 140 may unbend the flexible display apparatus 100 as shown in view (c) of FIG. 43.

In addition, in response to the bending information of the flexible remote controller 200 being received through the receiver 150, the controller 140 may control the display 120 to display a guide UI regarding the method for bending or unbending the display 120. Referring to views (a) and (b) of FIG. 43, the guide UI may be displayed on the display 120 in the form of a text.

According to another exemplary embodiment, in response to the remote control signal including the bending information of the bending of the flexible remote controller 200 being received through the receiver 150, the controller 140 may not directly bend the display 120 according to the bending information and may count a bending time of the flexible remote controller 200. Only in response to the counted bending time exceeding the predetermined threshold time, the controller 140 may control the bending driver 130 to bend the display 120.

Figure 44:
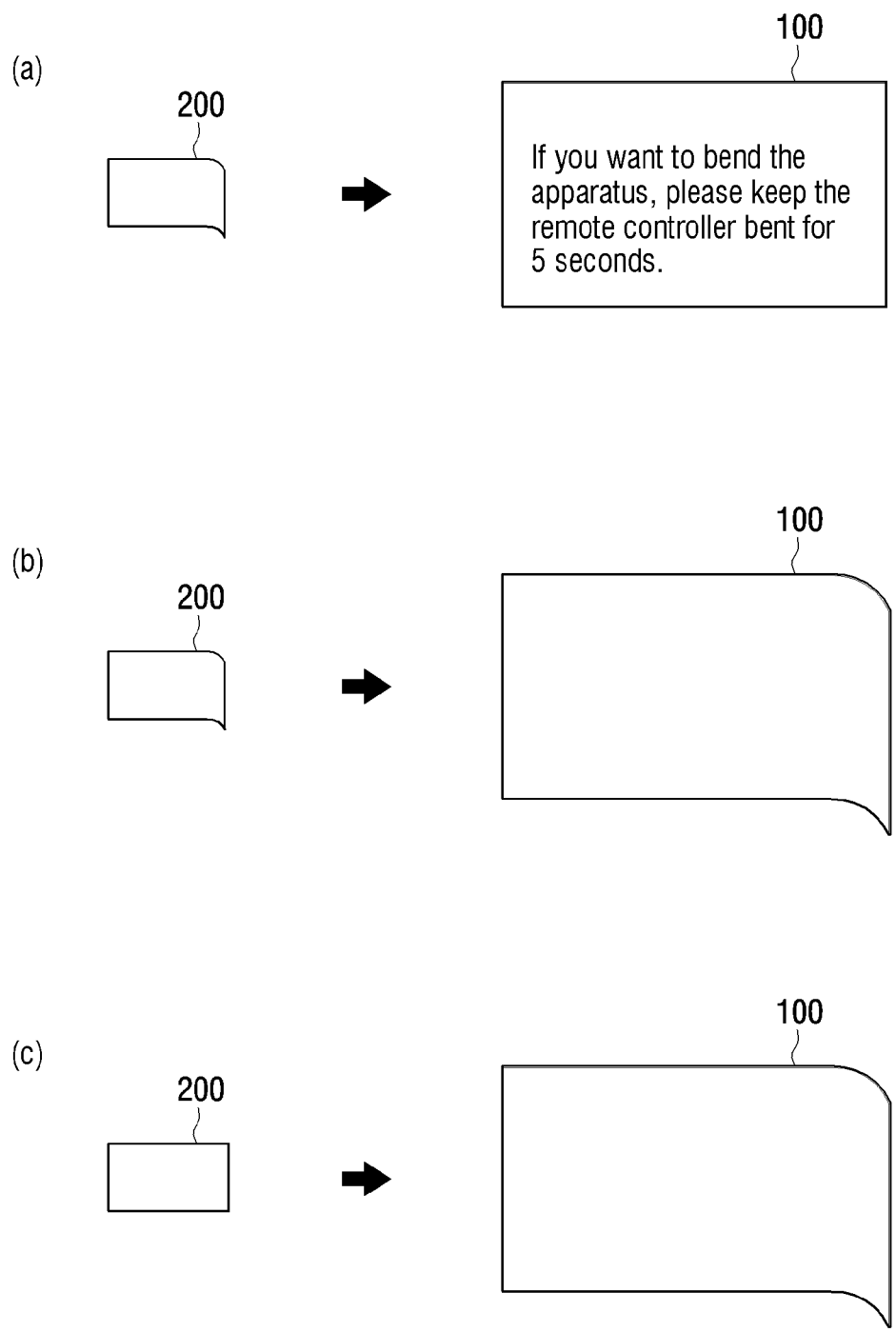

That is, referring to FIG. 44, in response to the flexible remote controller 200 being bent, the flexible display apparatus 100 is not bent as shown in view (a) of FIG. 44, and the controller 140 counts a time during which the bending state of the flexible remote controller 200 is maintained based on the bending information received through the receiver 150. In response to the bending state of the flexible remote controller 200 being maintained for the predetermined threshold time, that is, 5 seconds, the controller 140 controls the bending driver 130 to bend the display 120 and bend the flexible display apparatus 100 as shown in view (b) of FIG. 44. In response to the remote controller 200 being unbent before 5 seconds elapse, the flexible display apparatus 100 is not bent.

In response to the flexible remote controller 200 being unbent after the flexible display apparatus 100 is bent as shown in view (c) of FIG. 44, the bending of the flexible display apparatus 100 is maintained.

In this exemplary embodiment, the controller 140 may control the display 120 to display a guide UI regarding the method for bending the flexible display apparatus 100, as shown in view (a) of FIG. 44.

As described above, when the condition for maintaining the bending state of the flexible display apparatus 100 is satisfied, the bending of the flexible display apparatus 100 is maintained even when the flexible remote controller 200 is unbent. Therefore, the remote controller can be easily manipulated while the flexible display apparatus 100 can be bent by bending the flexible remote controller 200.

Figure 45:
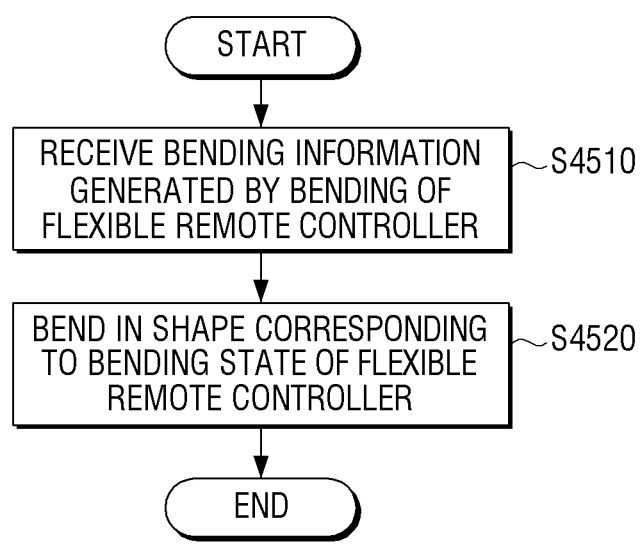
FIGS. 45 to 47 are flowcharts illustrating various control methods of a flexible display apparatus according to an exemplary embodiment.

FIG. 45 is a flowchart illustrating a method for controlling the flexible display apparatus 100 according to an exemplary embodiment.

Referring to FIG. 45, in response to a remote control signal including bending information generated by bending of the flexible remote controller 200 being received through the receiver 150 of the flexible display apparatus 100 (S4510), the controller 140 controls the bending driver 130 to bend the display by using the received bending information and bends the display apparatus 100 in a shape corresponding to the bending state of the flexible remote controller 200 (S4520).

Figure 46:
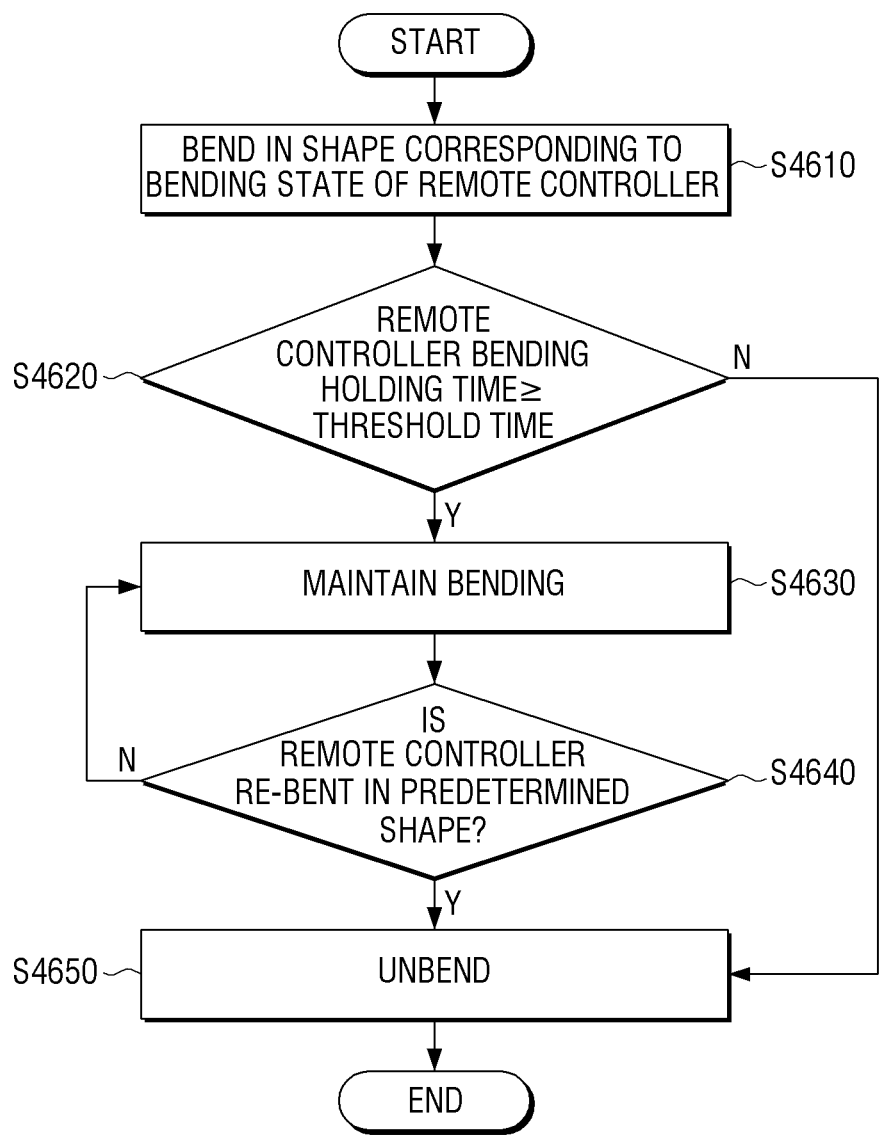

FIG. 46 is a flowchart illustrating a method for bending and unbending the flexible display apparatus 100, according to an exemplary embodiment.

Referring to FIG. 46, in response to a remote control signal including bending information on a bending state of the flexible remote controller 200 being received through the receiver 150, the controller 140 bends the flexible display apparatus 100 in a shape corresponding to the bending state of the flexible remote controller 200 based on the bending information (S4610).

The controller 140 determines whether a time during which the bending of the flexible remote controller 200 is maintained exceeds a predetermined threshold time or not (S4620). In response to the flexible remote controller 200 being unbent before the predetermined threshold time elapses (S4620, No), the controller 140 unbends the flexible display apparatus 100 (S4650), and, in response to the flexible remote controller 200 being unbent after the predetermined threshold time elapses (S4620, Yes), the controller 140 maintains the bending of the flexible display apparatus 100 (S4630). In response to the flexible remote controller 200 being re-bent in a predetermined shape while the bending state of the flexible display apparatus 100 is maintained (S4640, Yes), the controller 140 unbends the flexible display apparatus (S4650).

Figure 47:
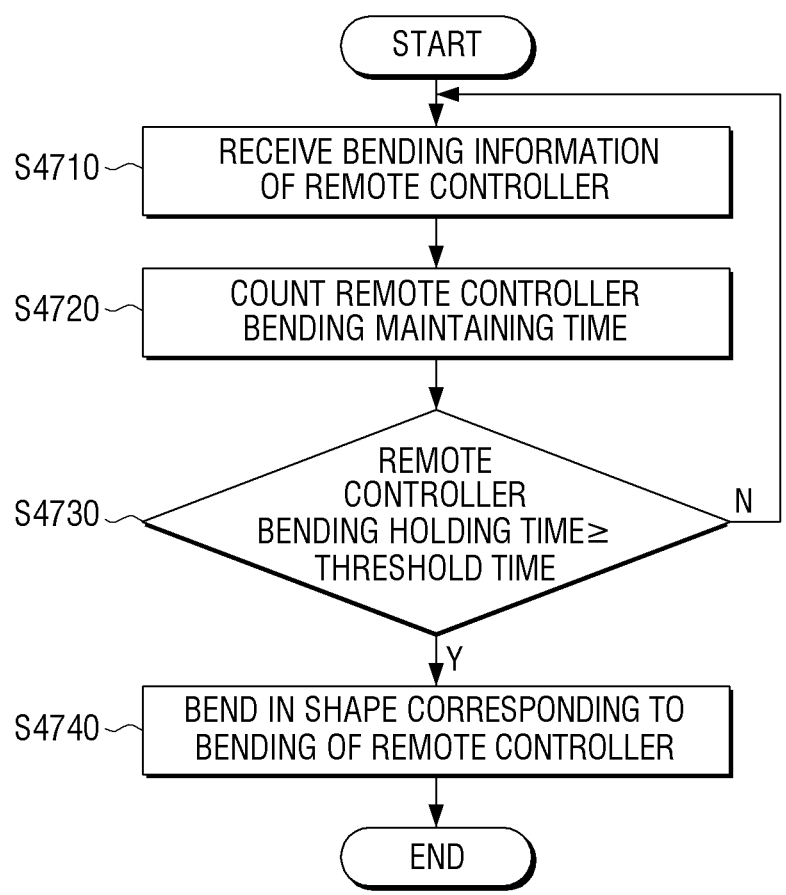

FIG. 47 is a flowchart illustrating a method for bending the flexible display apparatus 100 according to another exemplary embodiment.

Referring to FIG. 47, in response to bending information being received from the flexible remote controller 200 through the receiver 150 (S4710), the controller 140 of the flexible display apparatus 100 counts a bending time of the flexible remote controller 200 (S4720). In response to the bending holding time of the flexible remote controller 200 exceeding a predetermined threshold time (S4730, Yes), the controller 140 bends the flexible display apparatus 100 in a corresponding shape according to the bending information received from the flexible remote controller 200 (S4740).

In response to the flexible remote controller 200 being unbent before the bending holding time exceeds the predetermined threshold time (S4730, No), the controller 140 does not bend the flexible display apparatus 100 and waits for the flexible remote controller 200 being bent and counts a bending holding time.

According to the various exemplary embodiments as described above, the shape of the flexible display apparatus 100 can be deformed according to the bending of the flexible remote controller 200. Accordingly, the user can deform the shape of the flexible display apparatus 100 with a curvature and in a shape as the user desires easily and exactly, so that user convenience can be improved.

The operating method of the flexible display apparatus 100 according to the above-described exemplary embodiments may be implemented as a program and may be provided to the flexible display apparatus 100.

Specifically, a non-transitory computer readable medium, which stores a program performing: in response to the flexible remote controller 200 being bent, receiving corresponding bending information, and bending the flexible display apparatus 100 in a shape corresponding to the bending state of the flexible remote controller 200 based on the received bending information, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A flexible display apparatus comprising:
   a flexible display;
   a bending driver configured to deform the flexible display;
   a receiver configured to receive information indicating a bending deformation of a flexible remote controller ; and
   a controller configured to, in response to the receiver receiving the information indicating the bending deformation, control the bending driver to deform the display to a shape corresponding to the bending deformation of the flexible remote controller, the bending driver comprises:
   a plurality of piezoelectric elements arranged on a rear surface of the flexible display; and
   a driving circuit configured to independently drive each of the plurality of piezoelectric elements corresponding to the bending deformation of the flexible remote controller,
   wherein, in response to the flexible remote controller being undeformed within a predetermined threshold time, the controller undeforms the flexible display, and
   wherein, in response to the flexible remote controller being undeformed after the threshold time elapses, the controller maintains the deformation of the flexible display.

2. The flexible display apparatus of claim 1,
wherein the driving circuit is configured to drive each of the plurality of piezoelectric elements according to a driving signal generated in response to the bending deformation of the flexible remote controller, and
wherein each of the plurality of piezoelectric elements is deformed in a specific direction according to a polarity of the driving signal.

3. The flexible display apparatus of claim 1, wherein, in response to the flexible remote controller being re-deformed in a predetermined shape while the bending deformation of the flexible display is maintained, the controller undeforms the flexible display.

4. The flexible display apparatus of claim 1, wherein, in response to the receiver receiving the information, the controller is further configured to count a deformation time, and, when the counted deformation time exceeds another predetermined threshold time, the controller controls the bending driver to deform the flexible display.

5. The flexible display apparatus of claim 1, wherein, in response to the receiver receiving the information, the controller is further configured to control the flexible display to display a user interface (UI) for deforming the flexible display.

6. A flexible remote controller comprising
a flexible body;
a sensor configured to sense a bending deformation of flexible the body;
a communicator configured to communicate with a flexible display apparatus; and
a controller configured to, in response to the sensor sensing the bending deformation, control the communicator to transmit information corresponding to the bending deformation of the flexible display apparatus to instruct the flexible display apparatus to deform to a shape corresponding to the bending deformation of the flexible body,
wherein the controller of the flexible remote controller is further configured to instruct a controller of the flexible display apparatus to independently drive each of a plurality of piezoelectric elements arranged on a rear surface of the flexible display corresponding to the bending deformation of the flexible remote controller,
wherein, in response to the flexible remote controller being undeformed within a predetermined threshold time, the controller of the flexible remote controller is further configured to instruct the controller of the flexible display apparatus to undeform the flexible display, and
wherein, in response to the flexible remote controller being undeformed after the threshold time elapses, the controller of the flexible remote controller is further configured to instruct the controller of the flexible display apparatus to maintain the deformation of the flexible display.

7. The flexible remote controller of claim 6, wherein the sensor comprises a plurality of strain gages arranged on the rear surface or an edge area of the flexible body.

8. A display system comprising:
a flexible remote controller; and
a flexible display apparatus including a flexible display, the flexible display apparatus comprising:
a flexible display:
a bending driver configured to deform the flexible display:
a receiver configured to receive information indicating a bending deformation of a flexible remote controller; and
a controller configured to, in response to the receiver receiving the information indicating the bending deformation, control the bending driver to deform the flexible display to a shape corresponding to the bending deformation of the flexible remote controller,
the bending driver comprises:
a plurality of piezoelectric elements arranged on a rear surface of the flexible display; and
a driving circuit configured to independently drive each of the plurality of piezoelectric elements corresponding to the bending deformation of the flexible remote controller,
wherein, in response to the flexible remote controller being undeformed within a predetermined threshold time, the controller undeforms the flexible display, and
wherein, in response to the flexible remote controller being undeformed after the threshold time elapses, the controller maintains the deformation of the flexible display.

9. A method of controlling a flexible display apparatus including a flexible display, the method comprising:
receiving information indicating bending deformation of a flexible remote controller, and
in response receiving the information, deforming the flexible display apparatus to a shape corresponding to the bending deformation of the flexible remote controller by independently driving each of a plurality of piezoelectric elements arranged on a rear surface of the flexible display corresponding to the bending deformation of the flexible remote controller; and
wherein, in response to the flexible remote controller being undeformed within a predetermined threshold time, the controller undeforms the flexible display, and
wherein, in response to the flexible remote controller being undeformed after the threshold time elapses, the controller maintains the deformation of the flexible display.

10. The method of claim 9, wherein the flexible display apparatus comprises:
a flexible display; and
a plurality of piezoelectric elements arranged on a rear surface of the flexible display, and
applying a driving signal to each of the plurality of piezoelectric elements based on the information; and
deforming each of the plurality of piezoelectric elements in a specific direction according to a polarity of the driving signal.

11. The method of claim 9, further comprising: in response to the flexible remote controller being re-deformed to a predetermined shape while the bending deformation of the flexible display apparatus is maintained, undeforming the flexible display apparatus.

12. The method of claim 9, wherein the bending further comprises:
in response to receiving the information, counting a bending time; and
in response to the counted bending time exceeding another predetermined threshold time, deforming the flexible display.

13. The method of claim 9, further comprising: displaying a user interface (UI) for deforming the flexible display.

14. A method of controlling a flexible display apparatus including a flexible display using a flexible remote controller, the method comprising:
sensing a bending deformation of the flexible remote controller; and transmitting to the flexible display apparatus a signal indicating the bending deformation of the flexible remote controller to instruct the flexible display apparatus to deform to a shape corresponding to the bending deformation, wherein the signal includes a first instruction to a controller of the flexible display apparatus to independently drive each of a plurality of piezoelectric elements arranged on a rear surface of the flexible display corresponding to the bending deformation of the flexible remote controller, wherein, in response to the flexible remote controller being undeformed within a predetermined threshold time, the signal further includes a second instruction to the controller of the flexible display apparatus to undeform the flexible display, and wherein, in response to the flexible remote controller being undeformed after the threshold time elapses, the signal further includes a third instruction to instruct the controller of the flexible display apparatus to maintain the deformation of the flexible display.

15. The method according to claim 14, wherein the flexible display apparatus deforms to a same shape corresponding to the bending deformation of the flexible remote controller.

16. The display system according to claim 8, wherein the flexible remote controller includes sensors, wherein the sensors sense the bending deformation of the flexible remote controller.

17. The display system according to claim 16, wherein the sensors are one from among a bend sensor, a strain gage, a gyro sensor, a geomagnetic sensor, and an acceleration sensor.

* * * * *